United States Patent [19]
Ohtani et al.

[11] Patent Number: 5,430,276
[45] Date of Patent: Jul. 4, 1995

[54] IMAGE RECORDING APPARATUS

[75] Inventors: Kazuo Ohtani, Kawasaki; Kazuhide Sugiyama; Kazuo Kashiwagi, both of Tokyo, all of Japan

[73] Assignee: Canon Kabushiki Kaisha, Tokyo, Japan

[21] Appl. No.: 312,171

[22] Filed: Sep. 26, 1994

Related U.S. Application Data

[60] Division of Ser. No. 880,043, May 7, 1992, abandoned, which is a division of Ser. No. 821,889, Jan. 17, 1992, Pat. No. 5,155,341, which is a continuation of Ser. No. 311,282, Feb. 16, 1989, abandoned.

[30] Foreign Application Priority Data

| Feb. 22, 1988 | [JP] | Japan | 63-039828 |
| Jul. 29, 1988 | [JP] | Japan | 63-190069 |
| Dec. 14, 1988 | [JP] | Japan | 63-315899 |
| Dec. 16, 1988 | [JP] | Japan | 63-318030 |

[51] Int. Cl.6 .............................. G06F 15/20
[52] U.S. Cl. ............................ 235/375; 235/449; 235/454; 235/472; 355/40
[58] Field of Search ........... 355/40, 41; 235/449, 235/454, 472, 375; 382/57

[56] References Cited

U.S. PATENT DOCUMENTS

| 3,949,363 | 4/1976 | Holm | 340/146.3 |
| 4,201,978 | 5/1980 | Nally | 340/146.3 |
| 4,283,621 | 8/1981 | Pembroke | 235/375 |
| 4,341,463 | 7/1982 | Kashiwagi et al. | 355/14 |
| 4,436,391 | 3/1984 | Kashiwagi | 353/26 |
| 4,519,694 | 5/1985 | Kashiwagi et al. | 355/5 |
| 4,564,752 | 1/1986 | Lepic et al. | 235/437 |
| 4,574,395 | 3/1986 | Kato | 382/61 |
| 4,577,956 | 3/1986 | Klosterhuber et al. | 355/40 |
| 4,607,833 | 8/1986 | Svyatsky et al. | 271/10 |
| 4,652,733 | 3/1987 | Eng et al. | 235/472 |
| 4,665,318 | 5/1987 | Toda et al. | 250/570 |
| 4,819,034 | 4/1989 | Weinzierl et al. | 355/41 |

FOREIGN PATENT DOCUMENTS

| 3220977 | 12/1983 | Germany . |
| 3303647 | 11/1984 | Germany . |
| 3715501 | 3/1988 | Germany . |
| 3706992 | 9/1988 | Germany . |

Primary Examiner—Harold Pitts
Attorney, Agent, or Firm—Fitzpatrick, Cella, Harper & Scinto

[57] ABSTRACT

An image recording apparatus provided with a reader for reading information for identifying an original document; a recording unit for recording the image of the original document on a recording medium; a selector for selecting a first mode or a second mode; and a controller for causing the recording unit to record the image only when the identifying information is read by the reading means if the first mode is selected, or causing the recording unit to record the image regardless of the reading of the identifying information if the second mode is selected.

4 Claims, 29 Drawing Sheets

FIG.9
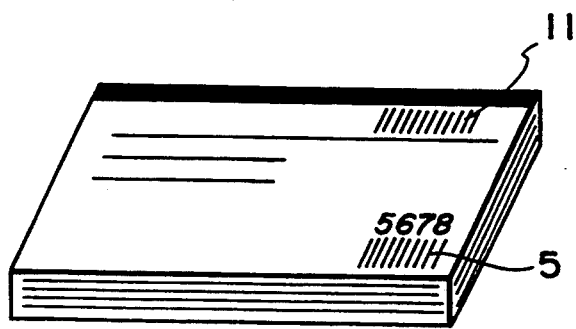
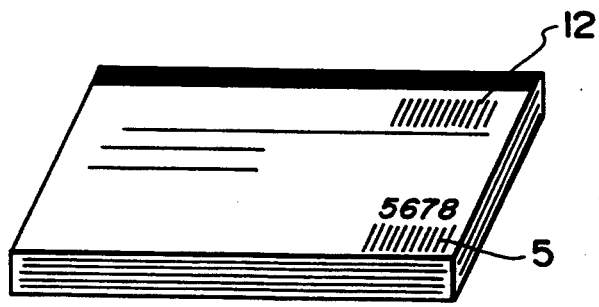

FIG. 10

| | |
|---|---|
| 1234567 | 123 |
| 1234568 | 124 |
| 1234569 | 125 | a → 1234568, 124 ← b

FIG. 11

| | |
|---|---|
| $a_1$ → 100 | 123 |
| 5678 | |
| $a_2$ → 101 | 124 |
| 5678 | |
| $a_1$ → 100 | 125 |
| 5679 | | b

F I G. 14
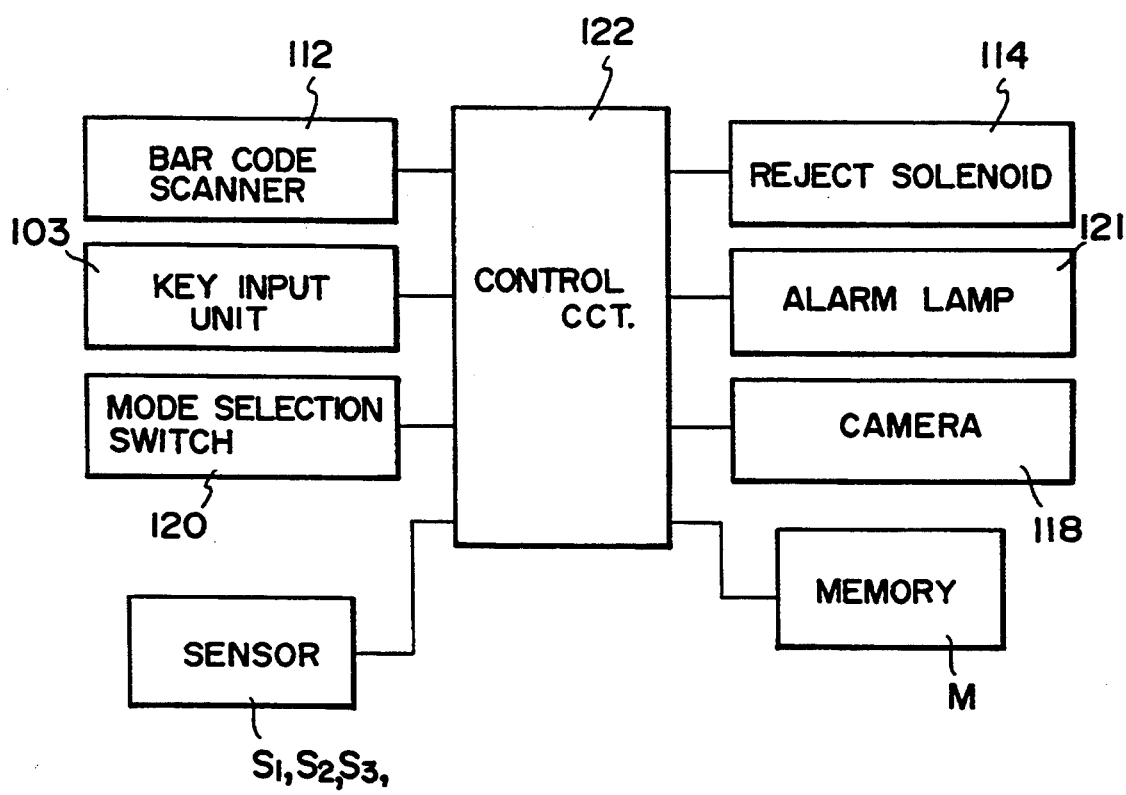

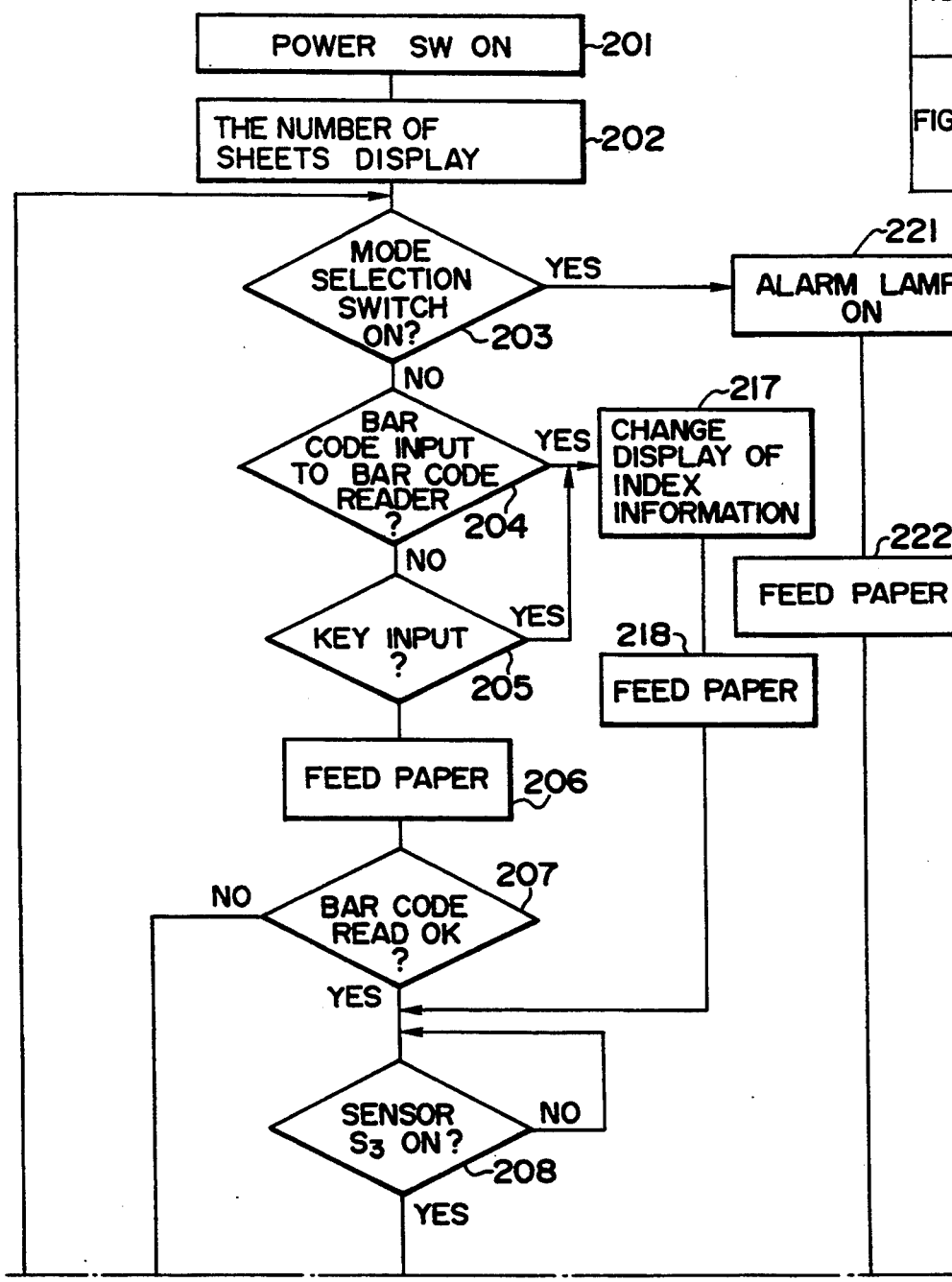

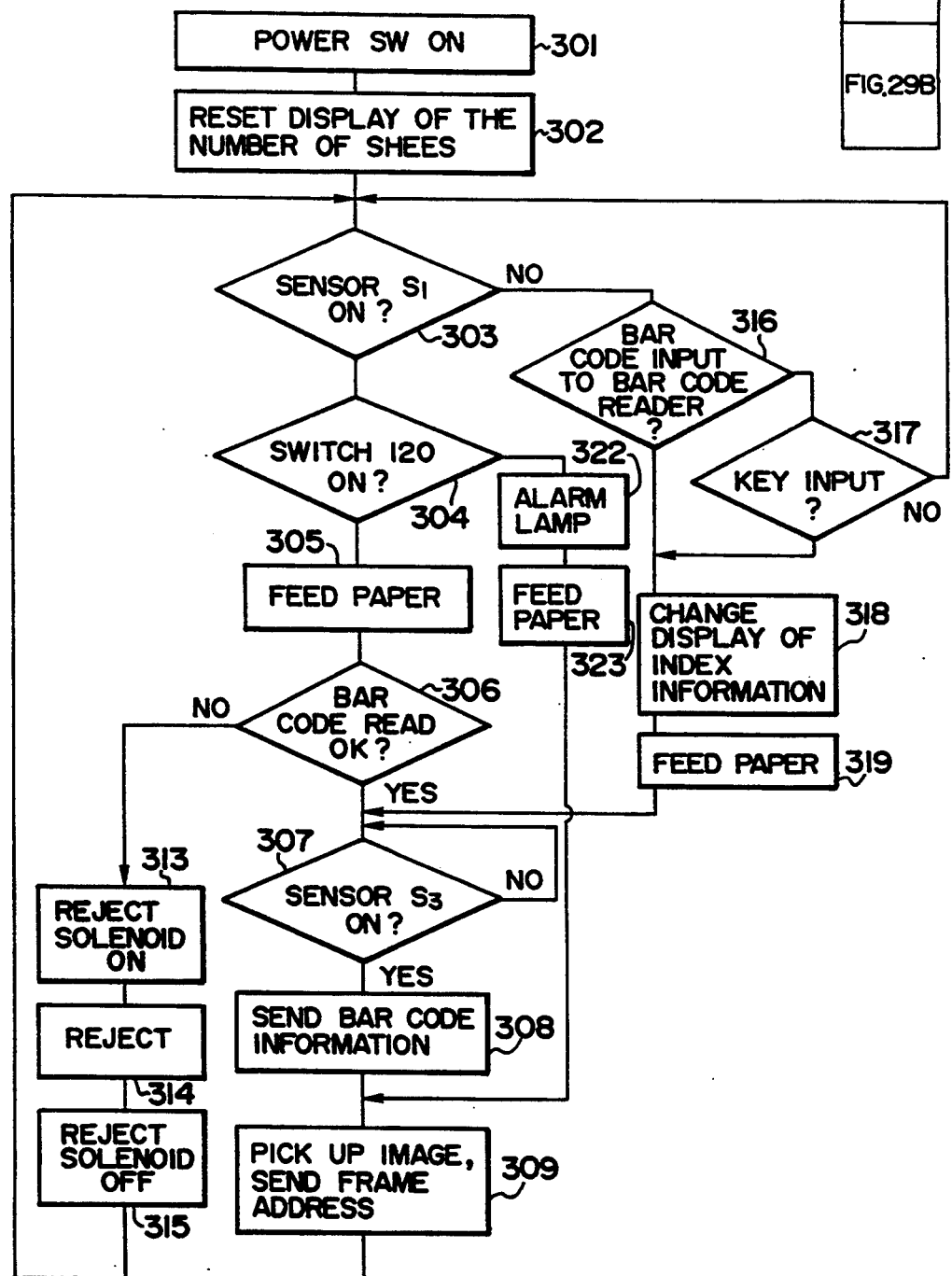
FIG. 29A
FIG. 29

IMAGE RECORDING APPARATUS

This application is a division, of application Ser. No. 07/880,043 filed May 7, 1992, now abandoned, which is a division of application Ser. No. 07/821,889 filed Jan. 17, 1992 now U.S. Pat. No. 5,155,341, which is a continuation of application Ser. No. 07/311,282 filed Feb. 16, 1989, which is now abandoned.

BACKGROUND OF THE INVENTION

1. Field of the Invention

The present invention relates to an image recording apparatus for recording an original image, accompanied by information for identifying each original image, on a recording medium.

2. Related Background Art

Storage of original images on microfilms or optical or magnetic disks have already been adopted for saving the storage space of various original documents generated in a large number, such as business forms, cheques or the like. For enabling easy access to such stored images, there is required input of index information corresponding to each image, but the input operation of such index information has been extremely time consuming. For solving this problem, there is already known an apparatus for reading the image on the original document and simultaneously reading code information, attached in advance to said original document as index information, with a suitable mechanism such as a bar code scanner, a magnetic image character reader (MICR), or an optical character reader (OCR).

In such known apparatus, an original document such as a business form or a cheque, bearing a bar code as the index information, is placed on a photographing position, and the image of said document is recorded on a microfilm in a photographing unit while the bar code of said original document is read with a bar code reader at the same time.

The bar code thus read is stored in a memory in such a manner that said bar code corresponds to the address (frame) number of the image recorded on the microfilm, thereby ensuring easy access to the image later.

In such conventional apparatus, however, the index information will be lost if the bar code of the original document is smeared, or the document lacks such bar code for some reason. For such original document there is required a manual input of the corresponding index information afterwards into the memory.

However the business forms etc. often have a back-printed carbon layer for copying, which tends to smear another form when it is superposed thereon. Besides such business forms are often handled rather roughly. Consequently the above-mentioned trouble occurs quite frequently, and it is not easy to find out the original document for which the bar code has not been read. For this reason the above-mentioned input operation is not efficient, and the access to the stored image later may become impossible if said input operation is forgotten.

Also in such conventional apparatus, the manipulation is cumbersome because the operation of input of the index information with the bar code scanner is conducted independently from the photographing operation of the original image on the microfilm with a photographing switch. A possibility therefore exists that the access to the stored image becomes impossible because the input of the index information is forgotten at the photographing operation.

SUMMARY OF THE INVENTION

In consideration of the foregoing, an object of the present invention is to solve the above-mentioned drawbacks.

Another object of the present invention is to provide an image recording apparatus capable of simplifying the input of index information and the image recording operation, thereby preventing the forgotten input of the index information.

Still another object of the present invention is to provide an image recording apparatus capable of securely selecting the original document for which the index information has not been read, and securely enter and record the index information and the image.

More specifically the present invention provides an image recording apparatus comprising:
  reader means for reading index information for identifying the original document;
  recording means for recording the image of the original document; and
  mode selector means for selecting either a first mode for recording the image of the original document only when the index information is read by said reader means, or a second mode for image recording independently from the reading of the index information.

Also the present invention provides an image recording apparatus comprising control means for activating said recording means in relation to the reading of the index information by said reader means.

Also the present invention provides an information recording-retrieval system comprising:
  reader means for reading index information for identifying the image;
  recording means for recording address information indicating the position of image recording, in relation to the index information for said image;
  input means for entering the index information;
  mode selector means;
  control means for effecting, when a first mode is selected by said mode selector means, the image recording only when the index information is read by said reader means, or, when a second mode is selected, effecting the image recording only when the index information is entered by said input means; and
  retrieval means for searching the information recorded in said recording means and selecting the address information corresponding to a desired image.

BRIEF DESCRIPTION OF THE DRAWINGS

FIG. 9 is a view showing another example of the original document;

FIGS. 10 and 11 are charts showing the content of a disk;

FIG. 14 is a block diagram showing a main control system of said embodiment;

FIG. 28A and 28B depict is a flow chart showing the control sequence of photographing operation etc. in said embodiment;

FIG. 29A and 29B depict is a flow chart showing the control sequence of photographing operation etc. in another embodiment of the present invention.

DESCRIPTION OF THE PREFERRED EMBODIMENTS

Now the present invention will be clarified in detail by embodiments thereof shown in the attached drawings.

Figure 1:
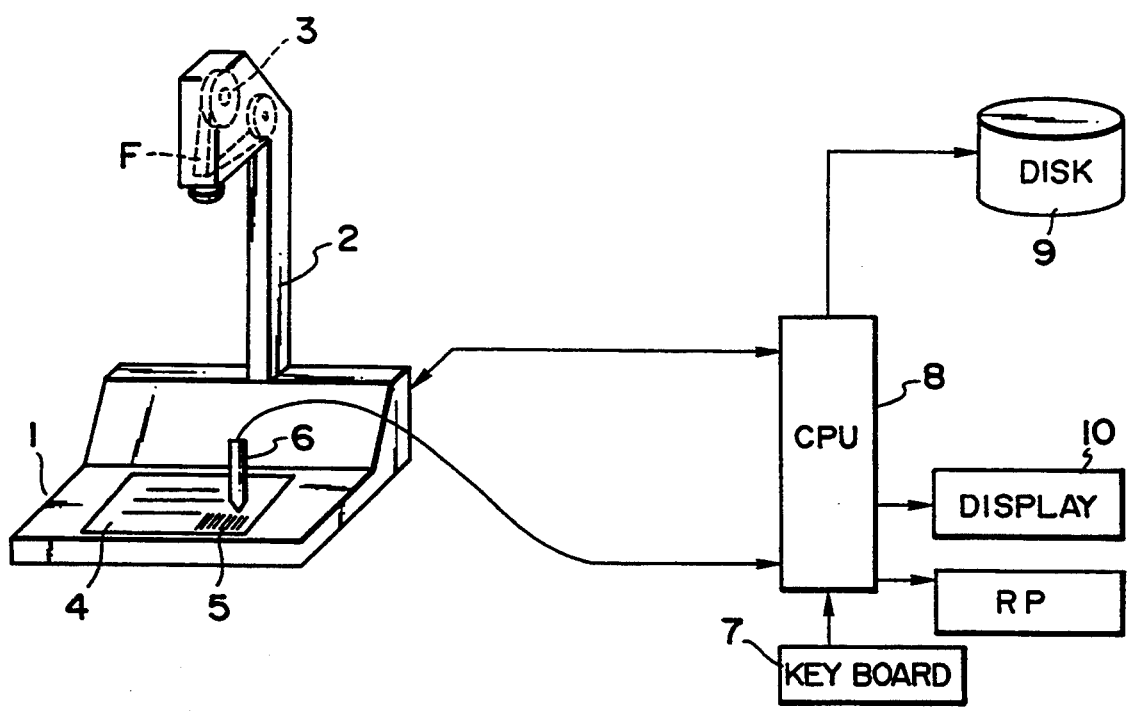
FIG. 1 is a schematic view of an image recording apparatus constituting a first embodiment of the present invention.

FIG. 1 schematically shows an image recording apparatus constituting a first embodiment of the present invention. An original table 1 is laterally provided with a support pillar 2, on which a microfilm camera 3 is installed. Said microfilm camera 3 is composed of a known camera mechanism, incorporating therein a rolled microfilm F.

An original document 4 to be photographed is placed on a photographing position on the original table 1, and the image of said original document 4, illuminated by an unrepresented illuminating source, is recorded on the microfilm F by the camera 3. At this photographing, a blip mark is recorded, in a lateral part of the image recorded on the film, by means of unrepresented blip recording means.

Figure 2:
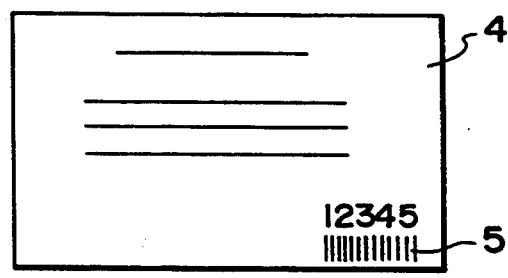
FIG. 2 is an upper plan view of an original document.

The original document 4 can be a business form or a cheque, bearing, as shown in FIG. 2, a bar code 5 indicating the number of the original document and serving as index information for identifying each original document.

There are also provided a bar code reader 6 for reading the bar code 5 on the original document; a keyboard 8 for data input; a computer (CPU) 8; a disk memory 9 composed for example of a magnetic disk, an optical disk or a magnetooptical disk for recording index data; and a display unit 10 for indicating the index data etc.

Figure 3:
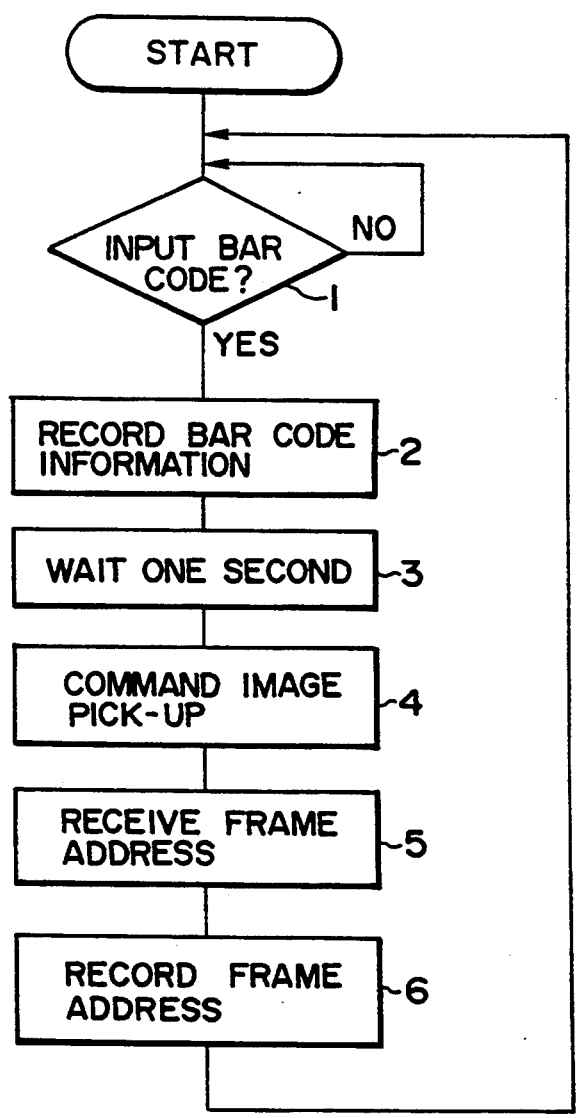
FIG. 3 is a flow chart showing the control sequence of said first embodiment.

The recording operation of the camera 3 is executed according to a program of the CPU 8, of which flow chart is shown in FIG. 3.

The microfilm camera 3 and the CPU 8 are capable of bidirectional communication. In case of photographing an original document, the operator manually scans the bar code 5 of the original document 4 placed in the photographing position on the original table 1 with the bar code reader 6, thereby reading the bar code (step 1).

Upon receiving an original number represented by the bar code from the bar code reader 6, the CPU 8 records said original number in the disk 9 (step 2), and, after a time lag of for example 1 second, sends a photographing command signal to the microfilm camera 3 (steps 3, 4). Upon receipt of the signal the microfilm camera 3 starts the photographing of the original document 4 placed in the photographing position, and simultaneously sends the frame address of the image recorded on the microfilm to the CPU 8 (step 5). Said frame address indicates the number of the frame counted from the leading end of the microfilm, and can be determined by counting the number of film frames with a frame counter of the microfilm camera, or by counting the number of the original documents, or by counting the number of blip mark recordings. After the photographing of the original image, the number of the frame counter is sent as the frame address to the disk 9 through the CPU 8, and said frame address is recorded on the disk 9, in correspondence with the original number (step 6). In this manner the index data are complied on the disk 9. If the input of bar code is not conducted the step 1, the sequence does not proceed to the step 2, so that the original document is not photographed. Consequently, if the bar code cannot be read for example by a smear, the original document is not photographed so that incomplete index data are not formed.

The index data recorded on the disk 9, after repeating the above-explained procedure for plural original documents, are composed, as shown in FIG. 10, of original numbers a respectively corresponding to frame addresses b. The roll film F after photographing and development, and the disk 9 are stored in this state. At the image retrieval, the original number of a desired original document is entered from the keyboard 7. Thus the CPU 8 retrieves, from the content of the disk 9 (FIG. 12), the frame address corresponding to said original number, and said frame address is displayed on the display unit 10. The operator reads said address and sets it in a reader-printer RP with a known retrieving mechanism, in which the roll film F is loaded, whereby the image of the desired original document can be displayed on a screen.

In the present embodiment, it is not necessary to manipulate the photographing switch for activating the camera. Also the bar code information and the image can be securely recorded without input error, since the original document is not photographed unless the input of the bar code is conducted.

In the following there will be explained another embodiment, in which employed are original documents each bearing, in advance, as shown in FIG. 9, a classification bar code 11 or 12 indicating the kind of the original document (said bar code being common for the same stack of original documents), and an original number bar code 5 (serial in the same stack).

At photographing, the aforementioned bar code reader is used for reading the classification bar code and the original number bar code, to record the index data, as shown in FIG. 11, on the disk 9, including the original numbers a, frame addresses b, a code a1 indicating the sales form, and a code 2a indicating the order form.

Thereafter, the image of a desired business form recorded on the microfilm can be retrieved by entering a code "100" or "101" indicating the kind of the stack of the business forms of the desired image, and an original number into the keyboard 7.

Figure 4:
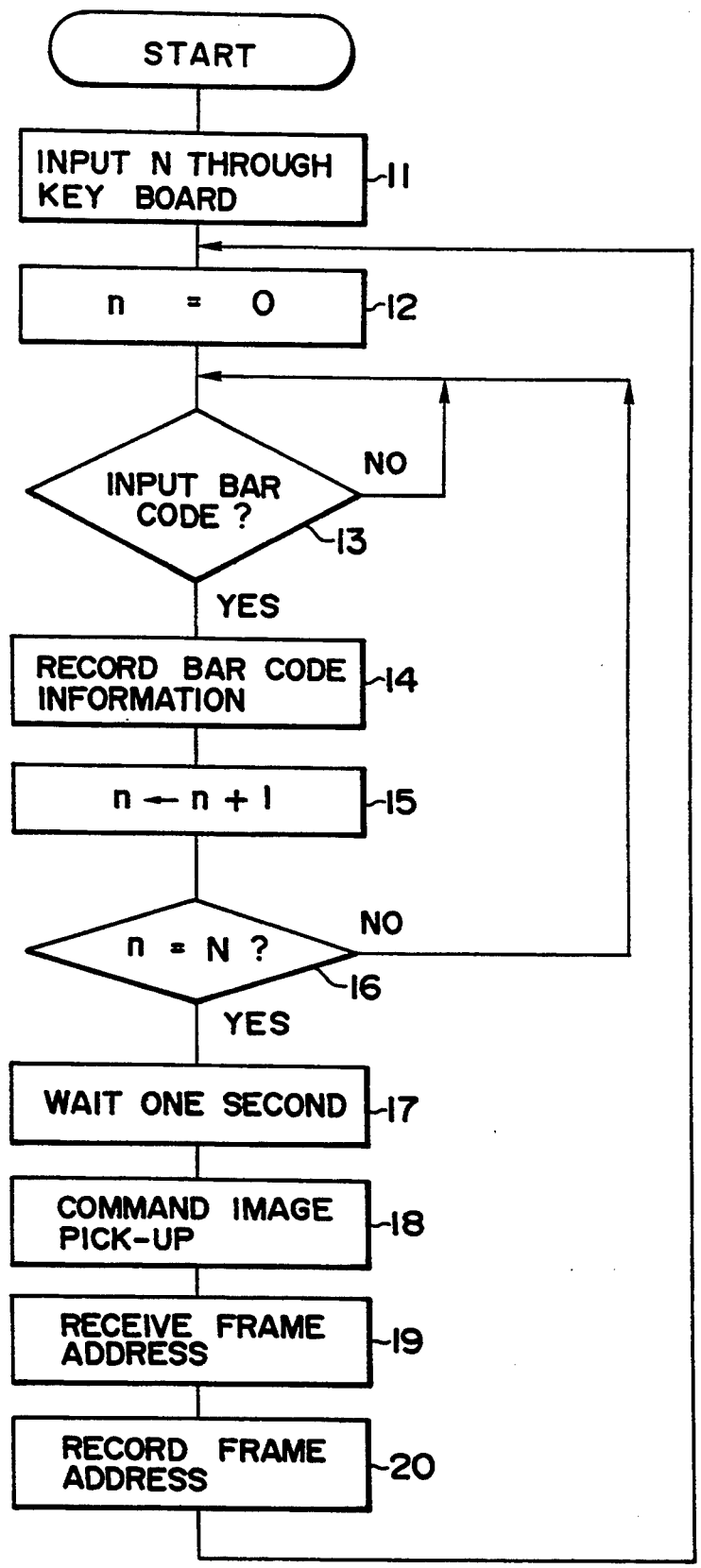
FIG. 4 is a flow chart for another embodiment.

For achieving such recording and retrieval of the original image, it is necessary to securely enter two bar codes at the photographing of an image. FIG. 4 shows the control sequence for image recording with such bar code reading operations.

Referring to FIG. 1, the operator at first enters the number of bar codes attached on each original document, from the keyboard 7 (step 11). Then a counter n indicating the number of inputs of the bar codes is set to "0" (step 12). Thereafter, at each input of a bar code, the data thereof are recorded on the disk (steps 13, 14), and the value of the counter n is increased by one (step 15). After N inputs of the bar codes, a photographing command signal is sent to the microfilm camera with a delay of one second (step 18), and a frame address received from the microfilm camera is recorded on the disk 9, corresponding to the bar code data already entered.

In this manner the input of required plural bar codes can be securely achieved.

Figure 5:
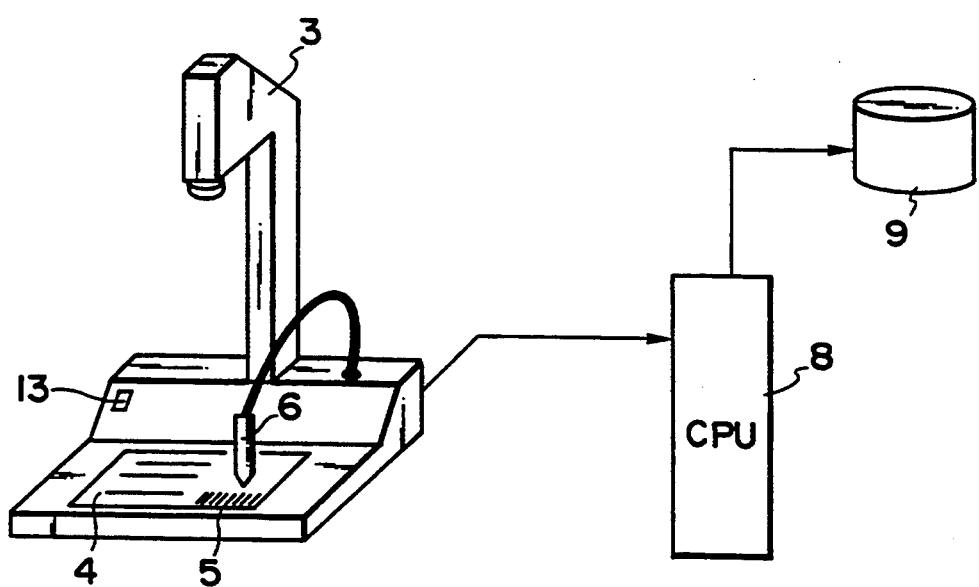
FIG. 5 is a schematic view of an image recording apparatus constituting a second embodiment.
Figure 6:
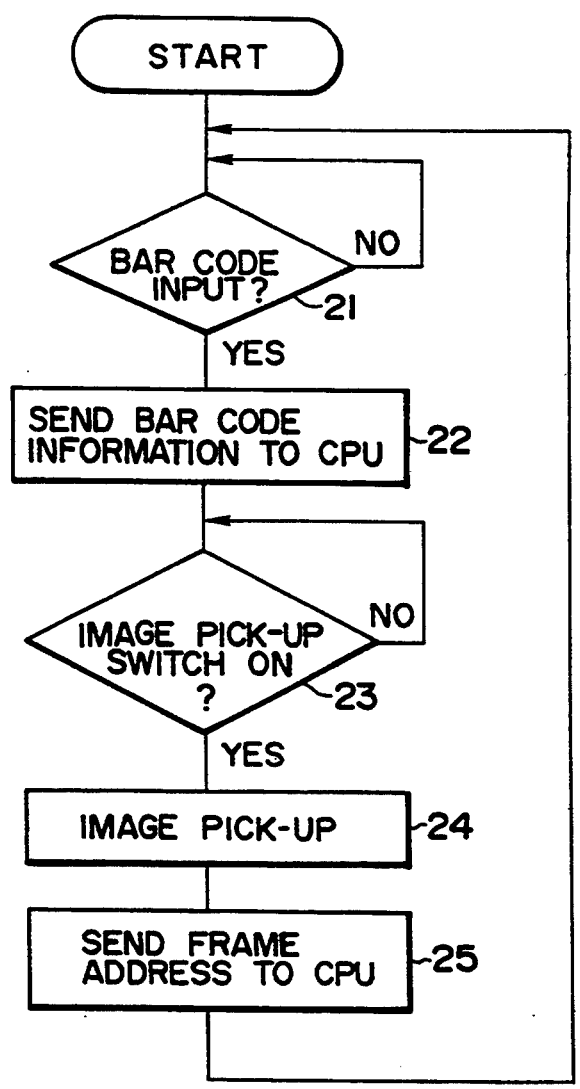
FIG. 6 is a flow chart showing the control sequence of said second embodiment.

Now reference is made to FIGS. 5 and 6 for explaining another embodiment.

In FIG. 5, the bar code reader 6 is attached to the microfilm camera 3. When the operator scans the bar code 5 with said bar code reader 6 (step 21 in FIG. 6), the information of said bar code is sent to the CPU 8 (step 22). Then the operator manipulates the photographing switch 13 (step 23) to photograph the original document with the camera 3 (step 24), whereupon the frame address is sent to the CPU 8 (step 25). If the operator manipulates the photographing switch 13 without entering the bar code, the photographing operation is not conducted since the sequence does not proceeds from the step 21 to 22. The above-explained sequence is executed according to a program of an unrepresent microcomputer in the microfilm camera. Also the CPU 8 records the bar code information and the frame address on the disk 9.

In contrast to the first embodiment, the present embodiment lacks the waiting time, so that the photographing operation can be conducted by the manipulation of the photographing switch even immediately after the input of the bar code. It is therefore possible to increase the operating speed and to prevent forgotten input of the bar code.

Figure 7:
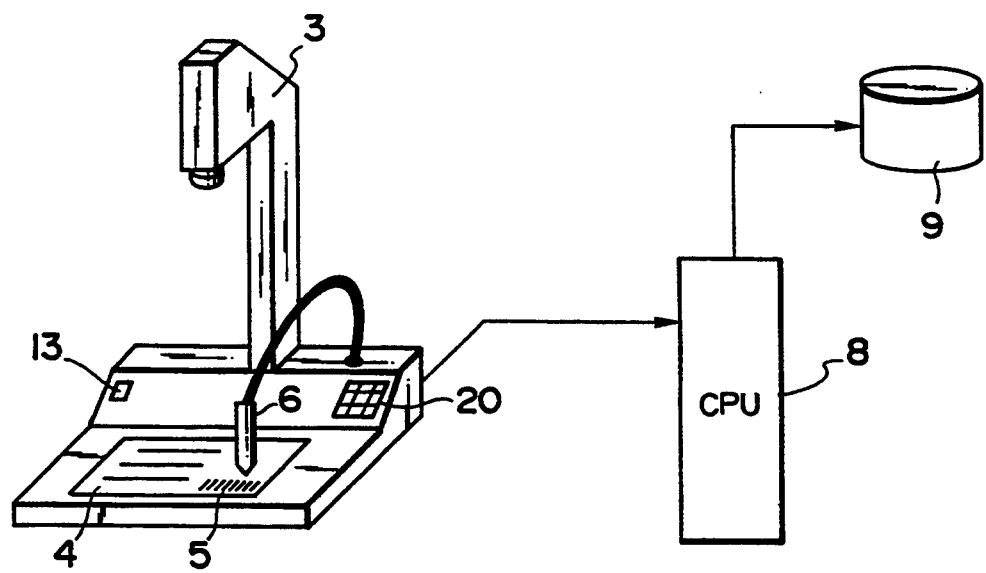
FIG. 7 is a schematic view of an image recording apparatus constituting a third embodiment.
Figure 8:
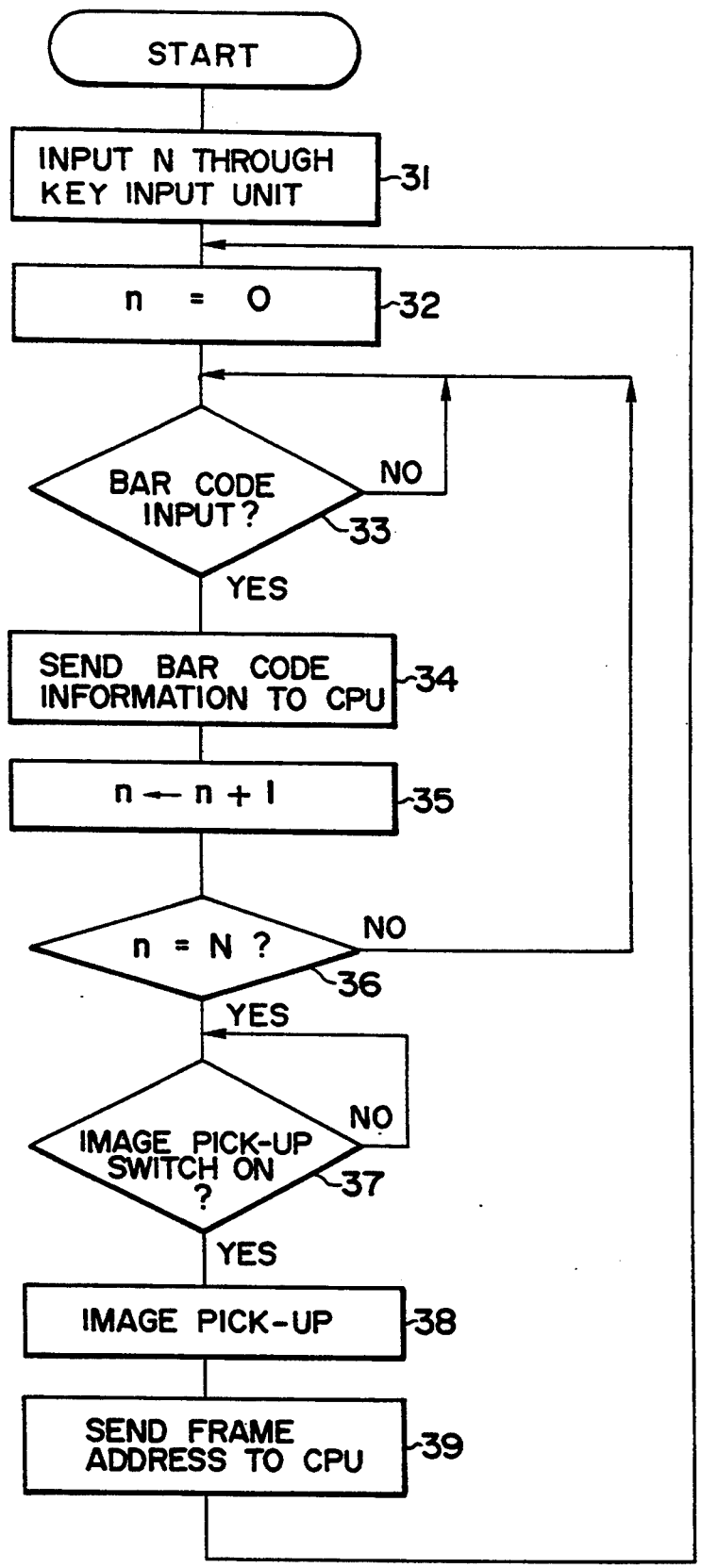
FIG. 8 is a flow chart showing the control sequence of said third embodiment.

Now reference is made to FIGS. 7 and 8 for explaining still another embodiment, in which the second and third embodiments are combined. As shown in FIG. 7, data input keys 20 are integrally provided in the camera. The number N of bar codes attached on each original document is entered from said keys 20 (step 31), and the counter n is set at "0" (step 32). Thereafter, at each input of bar code, said bar code data are sent to the CPU 8 (step 34), and the content of the counter n is increased by one (step 35). When the bar code input is conducted N times (step 36), the actuation of the photographing switch 13 is monitored (step 37). In response to said actuation, the photographing operation is conducted (step 38), and the frame address is sent to the CPU (step 39). In this way the photographing switch 13 cannot be activated unless the bar code is entered N times. The above-explained control is executed by a microcomputer in the microfilm camera 3. Also the CPU 8 records the bar code information and the frame addresses in mutually corresponding relation on the disk 9.

In the present embodiment, the photographing operation can be conducted by the manipulation of the photographing switch 13 even immediately after the input of the bar code N times, so that it is possible to increase the operating speed. Also N bar codes can be securely recorded.

In the foregoing embodiment, at the recording of an image on the recording medium, the input of index information for the image is linked with the image recording operation on the recording medium, so that the information input and the image recording can be achieved with simple operation. Also the index data can be securely prepared.

Figure 12:
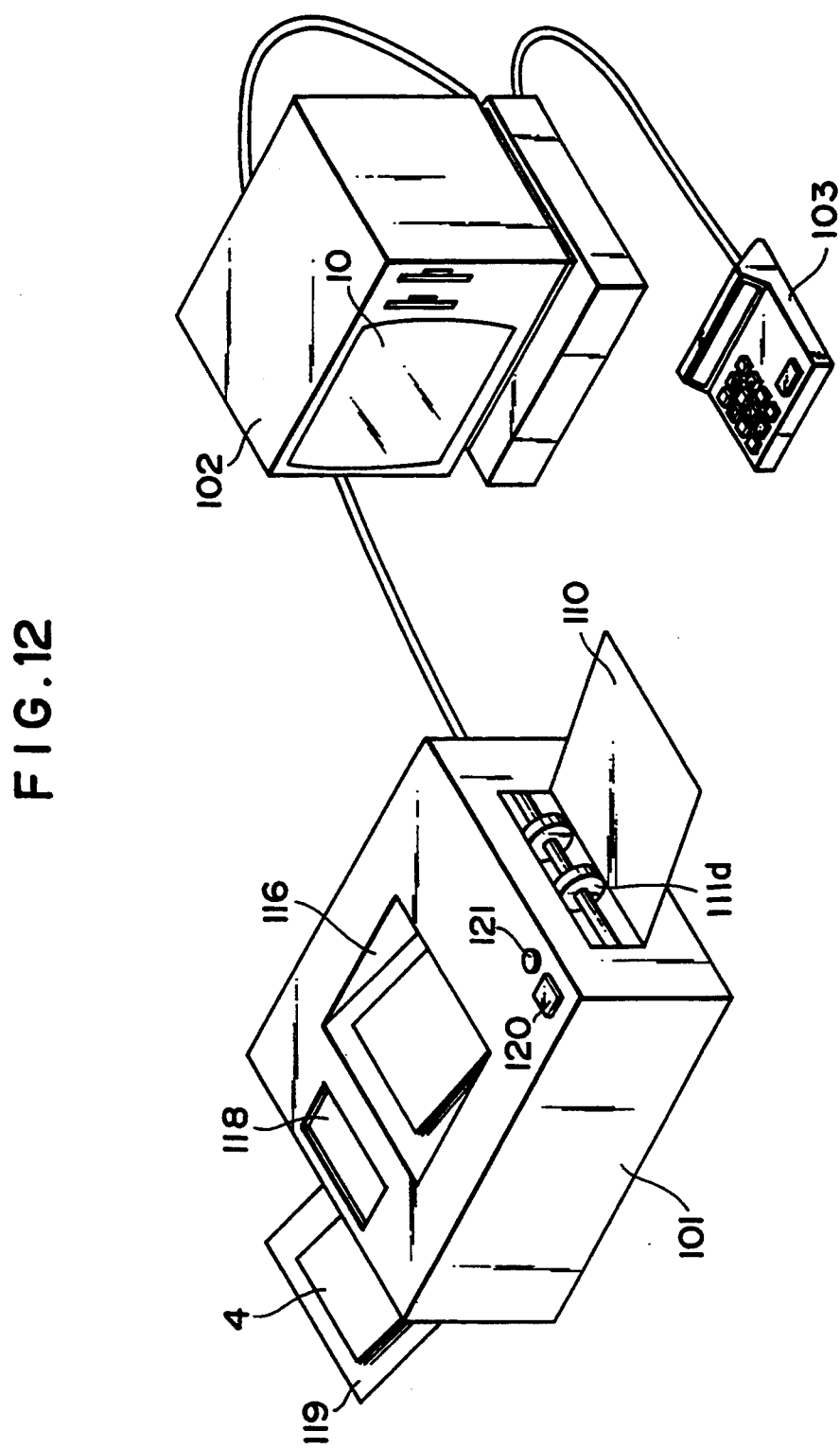
FIG. 12 is an external perspective view of an image recording apparatus constituting a fourth embodiment of the present invention.

FIG. 12 is an external view of an image recording apparatus constituting a fourth embodiment of the present invention, essentially composed of a photographing unit 101 for photographing the original document 4; a control unit 102 for controlling said photographing unit 101; and a key input unit (keyboard) 103 for entering index information.

Figure 13:
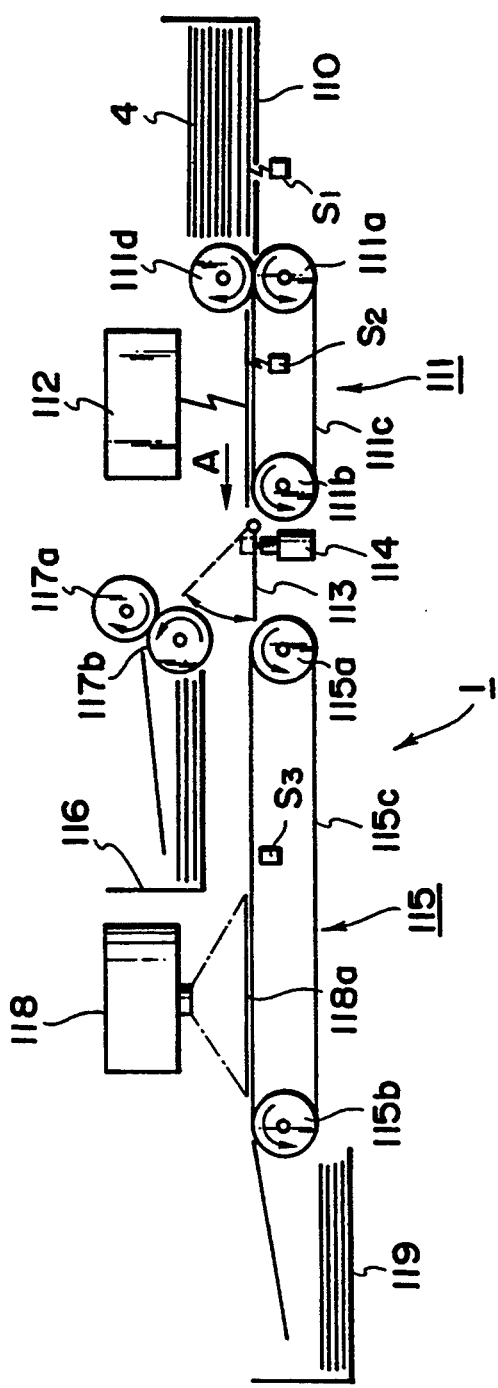
FIG. 13 is a longitudinal cross-sectional view schematically showing the structure of a photographing unit of said embodiment.

FIG. 13 schematically shows the structure of said photographing unit 101.

Referring to FIGS. 12 and 13, a sheet feeding tray 110 for stacking the original documents 4 is provided at the front side of the photographing unit 101, and a sensor S1 for detecting the presence of the original document 4 is provided thereunder. Adjacent to said tray 110, there is provided transport means 111 for separating the original document one by one from the bottom and transporting them in a direction A, consisting of a belt 111c supported between rollers 111a, 111b, and a roller 111d maintained in contact with said belt 111c at the position of the roller 111a. Above said transport means 111 there is provided a bar code scanner 112 as means for reading, by automatic scanning, the bar code attached on the original document 4. Between the rollers 111a, 111b there is provided a sensor S2 for detecting the original document on the belt 111c.

At the downstream side of the transport means 111 there is provided a guide plate 113, which is vertically movable by a reject solenoid 114 for directing the original document either to a first path or a second path. By means of the movement of said guide plate 113, the original document 4 transported in the direction A is guided either to transport means 115 positioned at an approximately same height as that of the transport means 111 or a reject tray 116 positioned above said transport means 115. Said transport means 115 is composed of a pair of rollers 115a, 115b and a belt 115c supported thereby. Between the reject tray 116 and the guide plate 113 there are provided discharge rollers 117a, 117b for discharging the original document 4 onto the tray 116.

Above the transport means 115 and adjacent to the reject tray 116, there is provided a camera 118, serving as recording means for photographing the original document 4 placed in a photographing position 118a on the belt 115c onto an unrepresented microfilm. Also in the downstream side of the transport means 115 there is provided a discharge tray 119 for receiving the original documents after photographing.

In the upper face of the photographing unit 101, as shown in FIG. 12, there are provided a mode selector switch 120 for selecting either a first mode for effecting the bar code reading and the original photographing, or a second mode for effecting the original photographing without bar code reading, and an alarm lamp 121 to be explained later. A sensor S3 is positioned in front of the photographing position 118a, for detecting the presence of the original document 4. Said first or second mode is selected respectively when the switch 120 is off or on.

FIG. 14 shows the structure of the control system of the present embodiment. The bar code scanner 112, reject solenoid 114, camera 118, mode selector switch 120 and alarm lamp 121 of the photographing unit 101 are connected to a control circuit 122, consisting of a computer, of the control unit 102. Also the key input unit 103 is connected to said control circuit 122. A memory M is provided for storing the index data.

Figure 15:
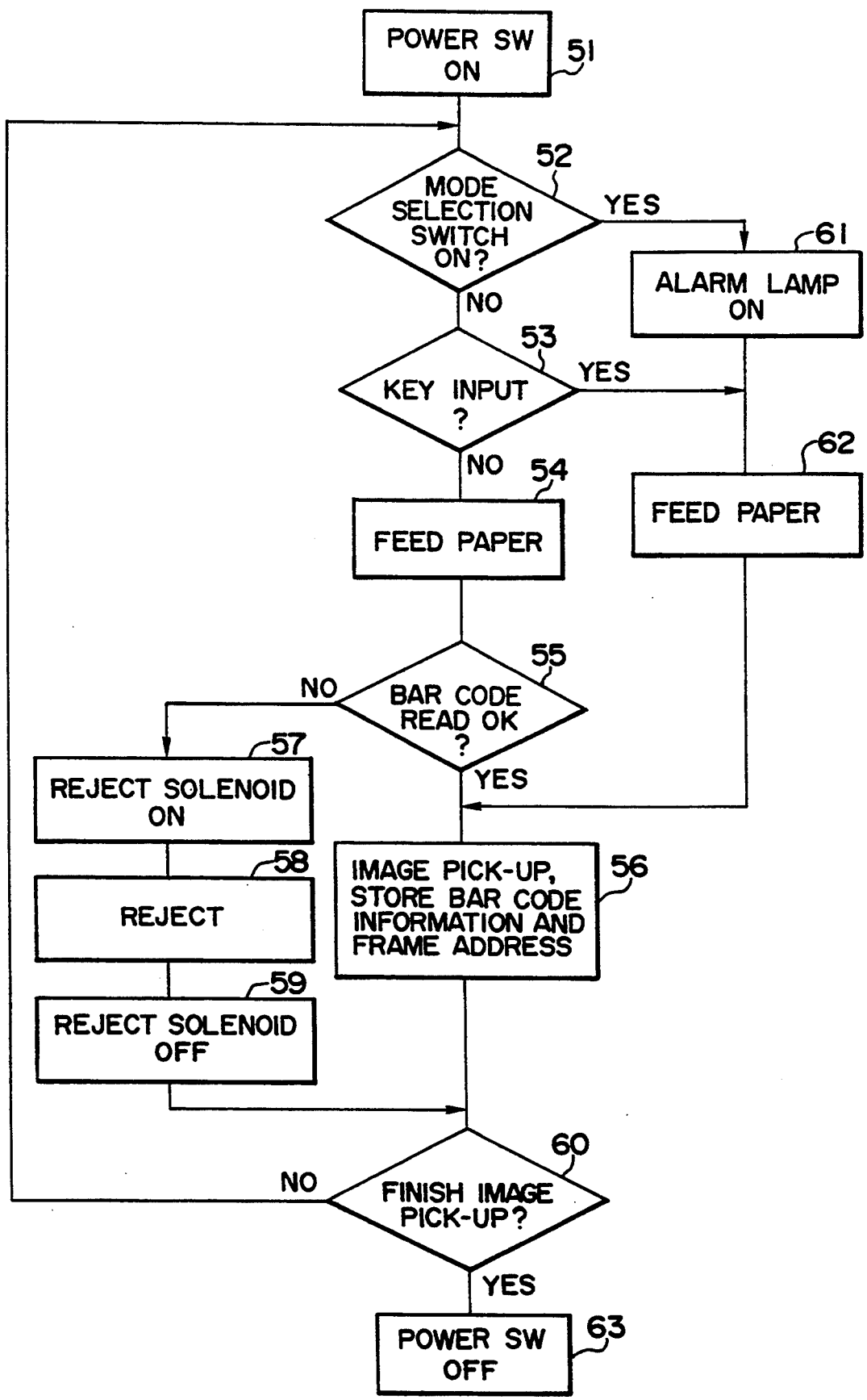
FIG. 15 is a flow chart showing the control sequence of photographing operation and so on in said embodiment.

Now reference is made to FIG. 15 for explaining the function of the present embodiment.

In case of photographing the original documents with bar codes, the operator turns on a power switch (step 51), then turns off the mode selector switch 120 to select the first mode, and feeds the original documents 4 without key input (steps 52-54). Thus the original document 4, of which bar code is exactly read by the bar code scanner 112, is advanced in the direction A by means of the transport means 111, guide plate 113 and transport means 115, and is photographed on the microfilm by the camera 118. At the same time the information of the bar code read by the scanner 112 and the frame address of the image are stored in the memory M.

On the other hand, if the bar code of the original document 4 cannot be exactly read due to the smear or lack of the bar code (step 55), the reject solenoid 114 is energized to move the guide plate 113, thereby guiding the original document 4 to the reject tray 116 (steps 57, 58). After the original document is discharged to the reject tray 116, the reject solenoid 114 is deactivated (step 59) whereby the guide plate 113 returns to the original position. The operations of the steps 52 to 59 are repeated until the original documents 4 on the feed tray 110 become exhausted (step 60).

For photographing the original document discharged to the reject tray 116, the mode selector switch 120 is maintained off (step 52). Then the bar code information of said original document is entered with the keys of the key input unit 103, and said original document is fed again (steps 53, 62). In this case the bar code scanner 122 does not effect the reading operation, so that the original document 4 is photographed with the camera 118 without rejection. At the same time the bar code information entered from the key input unit 103 and the frame address of the image are stored in the memory M (step 56). The photographing of all the original documents is completed by repeated the above-explained operations for all the original documents to be refed. In this manner the original recording and the preparation of index data can be achieved also for the original document of which bar code cannot be read. Upon detecting an original document, the sensor S2 releases a signal instructing the start of reading operation of the bar code scanner 112. When the bar code information is entered from the key input unit 103, the output signal of the sensor S2 is cancelled, so that the bar code scanner 112 does not effect the reading operation even when the original document is detected by the sensor S2.

Also upon detecting an original document, the sensor S3 releases a signal instructing the start of photographing operation of the camera 118. Said signal from the sensor S3 is counted by a counter in the control circuit 122, and the count of said counter is sent as the frame address to the memory M. Said counter is reset when the microfilm in the camera 118 is replaced. The sensors S1, S2, S3 are composed for example of microswitches or photocells.

Also the original documents not bearing bar codes can be photographed with the preparation of index data, without rejection, by means of the input of the index information from the key input unit 103.

In case of conducting the photographing operation only, without the indexing, the operator at first turns on the power supply (step 51), and turns on the mode selector switch 120 to select the second mode (step 52). In response the alarm lamp 121 is turned on (step 61), and the original document is advanced (step 62), whereby said original document 4 is photographed without the reading of the bar code (steps 56, 60). In this case the step 56 effects the photographing operation only. The alarm lamp 121 is turned on when the mode selector switch is turned on, in order to prevent a mistake that original documents with bar codes are photographed in this state without the reading of the index data, without being noticed by the operator.

Figures 19, 20:
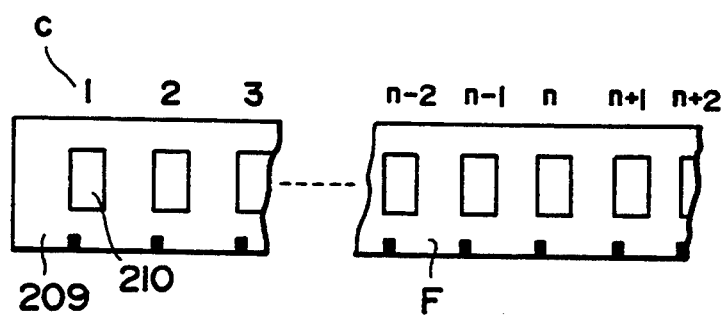
FIG. 19 is a view of a microfilm bearing images recorded thereon.
FIG. 20 is a schematic view of index data recorded in a memory.

FIG. 19 illustrates a microfilm on which images and blip marks are recorded. The image of the original document is recorded in each frame 210 of the microfilm F, and a blip mark 209 is recorded at the side of each frame. Numbers C are frame addresses, namely addresses of the images recorded on the microfilm. Said addresses are only shown for facilitating the understanding, but are not recorded on the film.

FIG. 20 shows index data stored in the memory M, consisting of frame addresses d and bar code information c. For example an original with the original number "5678" has a frame address "2" on the microfilm F, indicating that the image of said original document is recorded in the 2nd frame of said film F.

Figure 16:
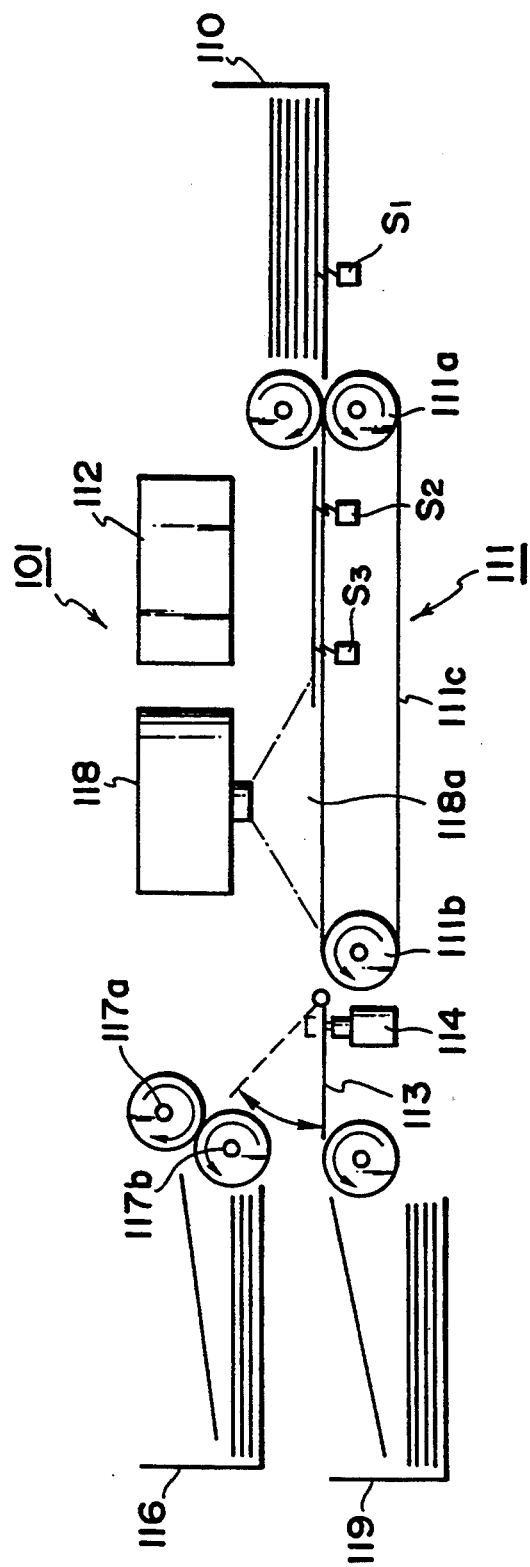
FIG. 16 is a longitudinal cross-sectional view schematically showing the structure of a photographing unit in a fifth embodiment of the present invention.

FIG. 16 shows an image recording apparatus constituting a fifth embodiment of the present invention, wherein same components as those in the foregoing embodiment are represented by same symbols or numbers. In the present embodiment, at the downstream side of the camera 118, there is provided a rejecting unit composed of the guide plate 113 and the reject solenoid 114. The photographing operation is executed, as in the preceding embodiment, according to the sequence shown in FIG. 15. Thus, also in the present embodiment, the original document of which bar code is not read is discharged to the reject tray 116 by the function of the solenoid 114. Consequently, as shown in FIG. 16, there can be employed only one transport means. Besides the trays 116, 119 can be superposed vertically, so that the apparatus can be compactified.

Figure 17:
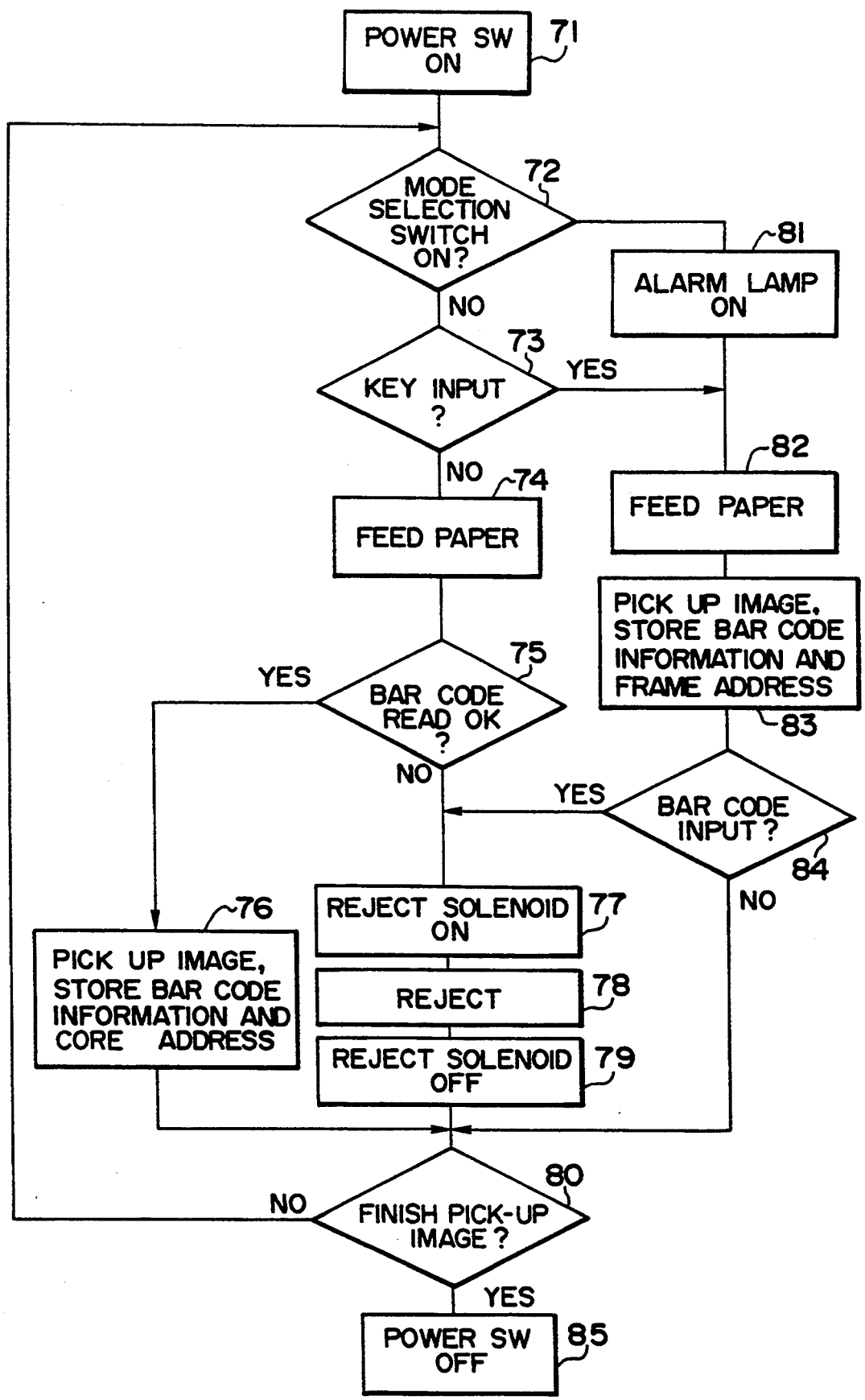
FIG. 17 is a flow chart showing control sequence of photographing operation etc. in another embodiment.

FIG. 17 is a flow chart showing the function of another embodiment of the present invention, utilizing the apparatus shown in FIG. 16 and involving additional functions. In this embodiment, the bar code is read with the scanner 112 and the original document is photographed with the camera 118 as in the preceding embodiment (steps 71-80, 85). On the other hand, in case the mode selector switch 120 is turned on (steps 72, 81) or data input is made with the keys (step 73), the original documents 4 are photographed (step 83) and then only those bearing bar codes are rejected and guided to the tray 116 (step 84) while those lacking the bar codes are guided to the tray 119. The presence or absence of bar code is identified from the output signal of the bar code scanner 112 obtained by scanning said original document.

In the present embodiment it is possible to check that an original document with bar code is transported, in addition to the check with the alarm lamp 121.

Figure 18:
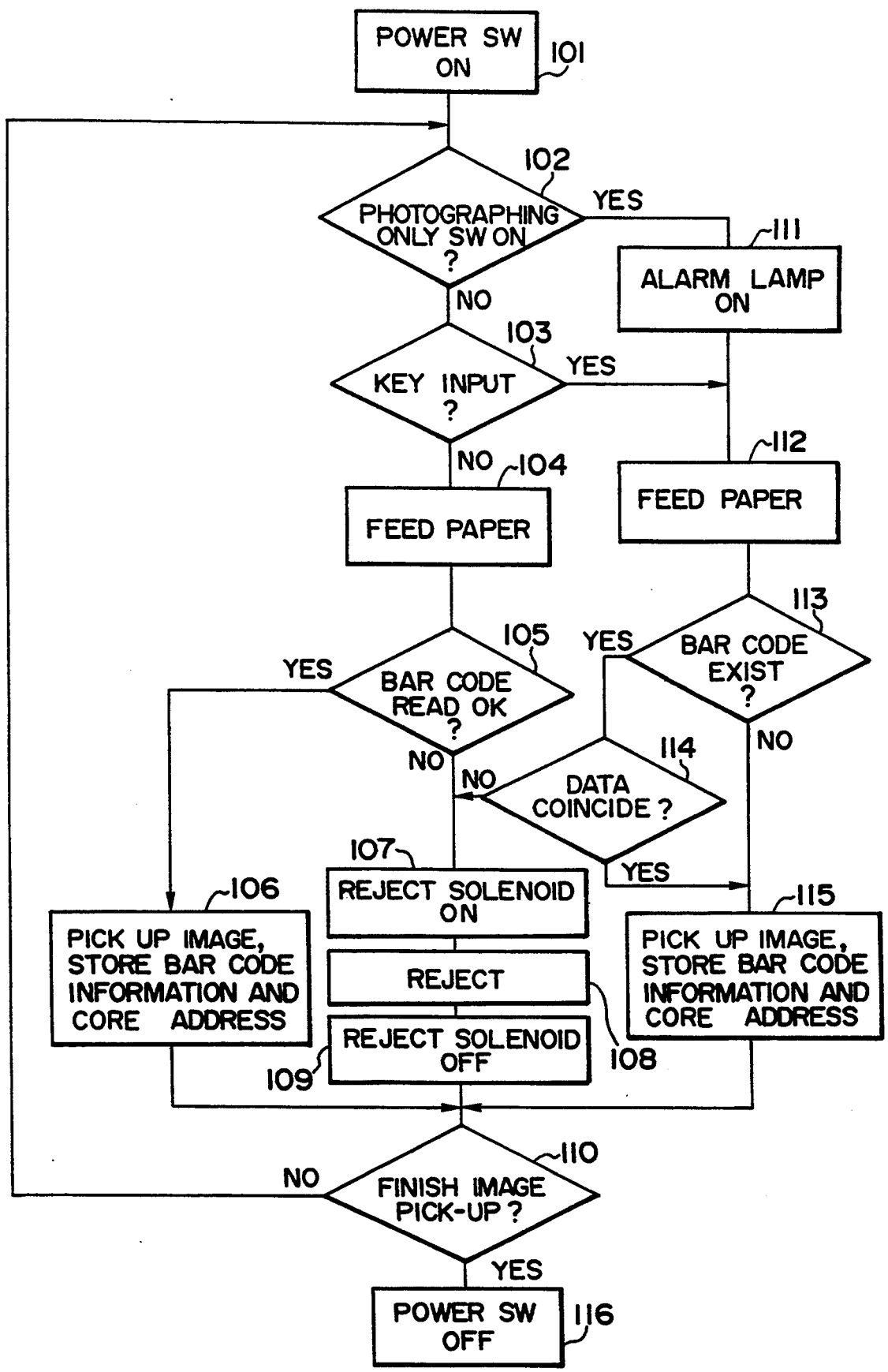
FIG. 18 is a flow chart showing control sequence of photographing operation etc. in still another embodiment.

FIG. 18 is a flow chart showing the function of another embodiment of the present invention. In this embodiment, the bar code is read with the scanner 112 and the original document is photographed with the camera 118 as in the preceding embodiment (steps 101-110, 116), but, with respect to an original document bearing bar code, at the key input and sheet feeding (steps 103, 112), the bar code information entered from the keys is compared with that read with the scanner 112 (steps 113, 114), and the photographing operation is conducted only for the original documents for which the two have coincided, and those not bearing the bar code (steps 115). In this manner the present embodiment has a function of checking whether the index data entered with the keys are correct.

The foregoing embodiments have been explained by an apparatus employing bar codes and a microfilm camera, but the present invention is not limited to these embodiments. For example the bar code can be replaced other codes for example readable with OCR or MICR. Also the recording means is not limited to a structure for recording on a microfilm, but can be means for recording the original image on a recording medium such as an optical disk or a magnetic tape through an image sensor such as a CCD, or electrophotographic recording means.

In the embodiments shown in FIGS. 12 to 18, the original documents of which index data could not be read can be securely selected, and can be subjected to image recording anew by the entry of the index data from the input means. It is therefore not necessary to add new code information to the original document at said recording, as required in the conventional apparatus. Consequently the efficiency of the recording operation can be significantly improved, and the lack of input of index data, resulting from the cumbersome operations, can be prevented.

Also in case of selecting the second mode, enabling the image recording operation only, increases the field of use of the apparatus, and an alarm given in such case allows to check for the forgotten input of the index data.

Figure 21:
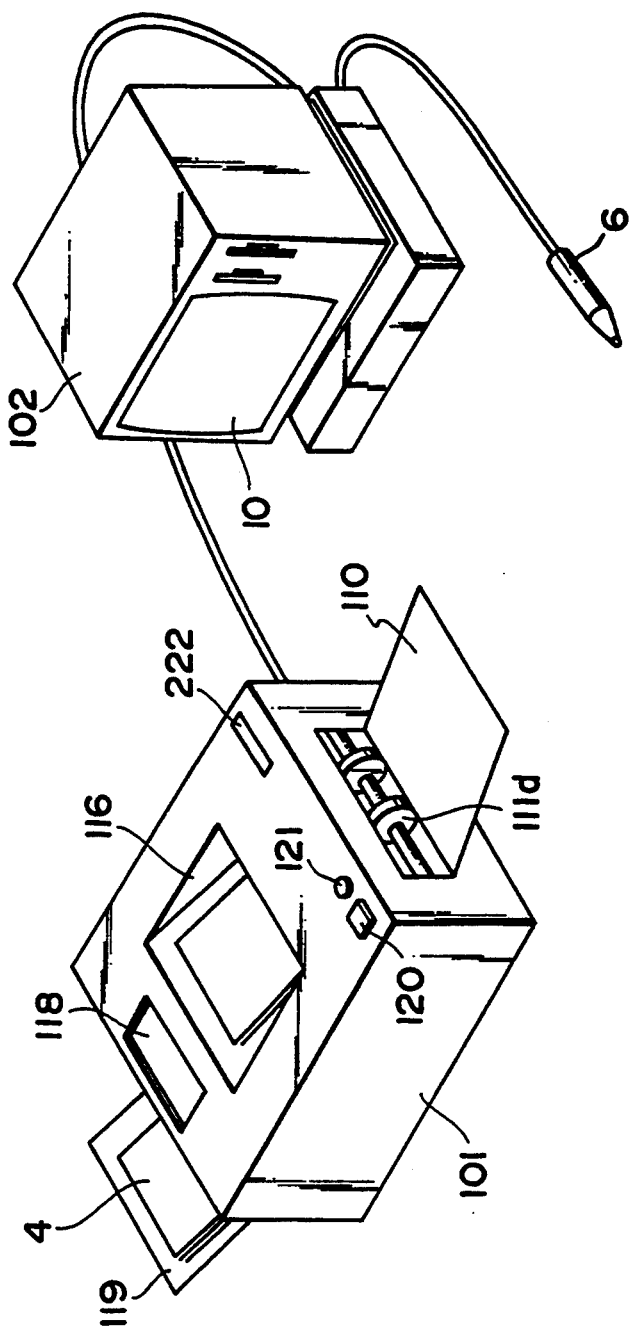
FIG. 21 is an external perspective view of an image recording apparatus according to a sixth embodiment of the present invention.

FIG. 21 shows an image recording apparatus constituting a sixth embodiment of the present invention, wherein provided is a display unit 222 for displaying the number of photographed original documents or the bar code data.

Figure 22:
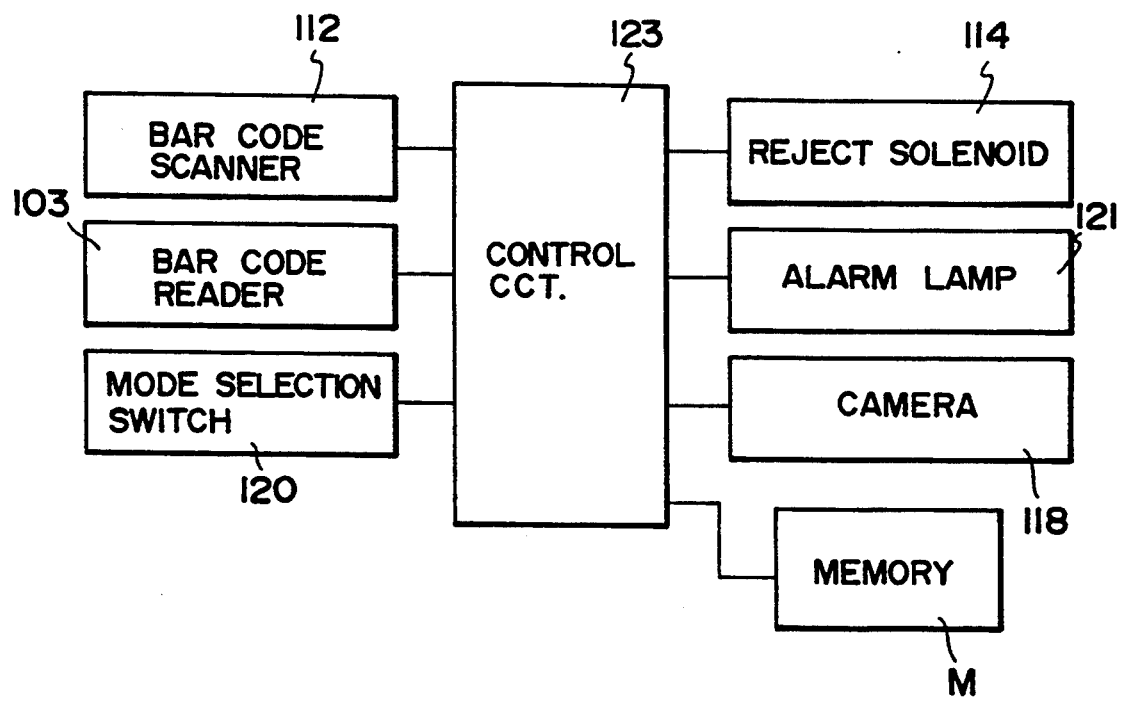
FIG. 22 is a block diagram showing a main control system of said embodiment.
Figure 23:
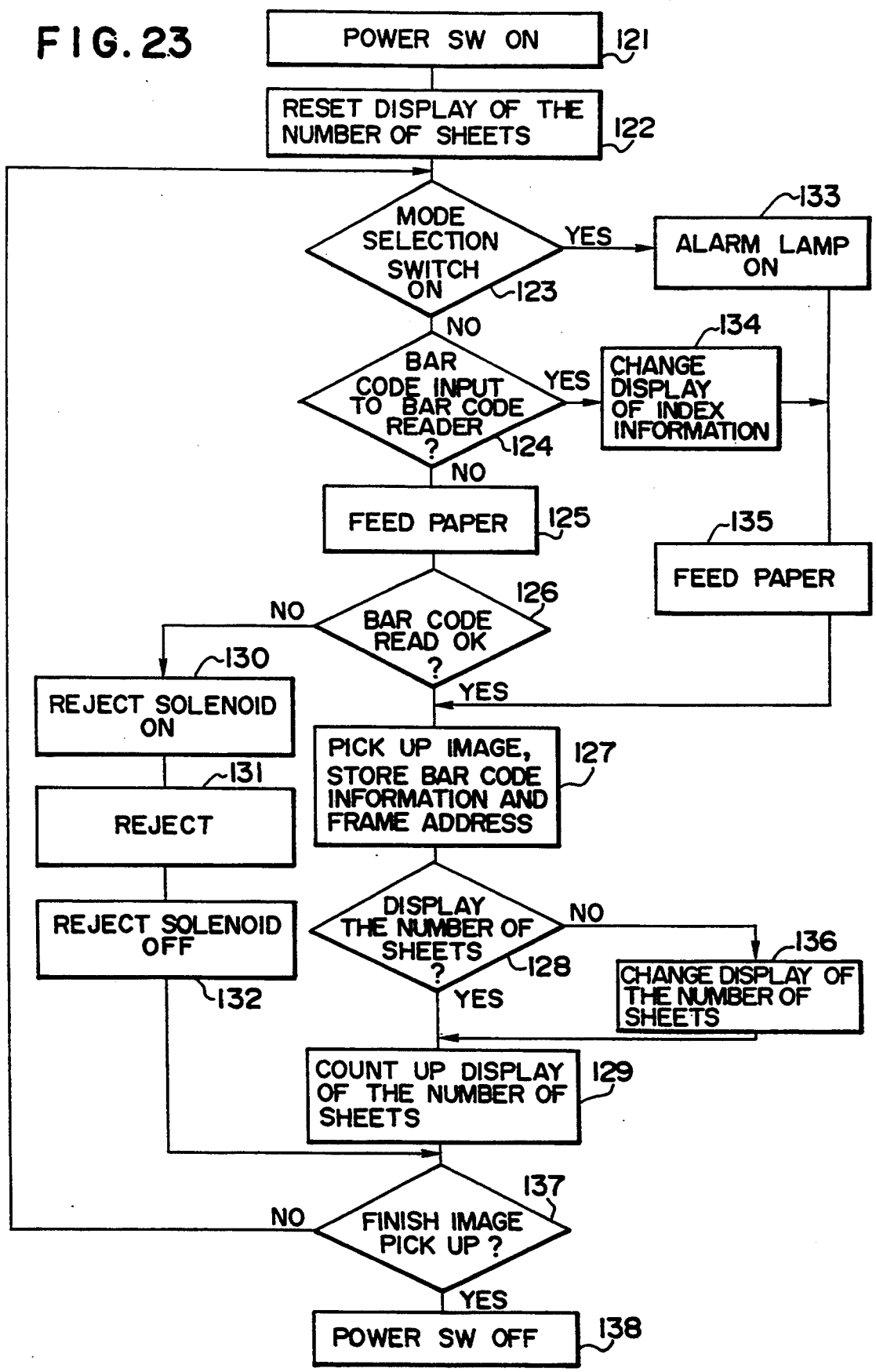
FIG. 23 is a flow chart showing the control sequence of photographing operation etc. in said embodiment.

FIG. 22 is a block diagram of a control system of said sixth embodiment, and FIG. 23 is a flow chart of the function thereof.

In the following there will be explained the function of the present embodiment, with reference to FIG. 23.

In case of photographing the original documents 4 with bar codes, the operator turns on the power switch (step 121), then resets the display unit 222 to a mode of indicating the number of photographed original documents (step 122), and feeds the original documents 4 without turning on the mode selector switch 120 and without the input with the bar code reader 6 (steps 123-125). Thus the original document, subjected to the reading of the bar code with the bar code scanner 112, is transported to the photographing position 118a by means of the transport means 111, guide plate 113 and transport means 115, and is photographed on the microfilm by the camera 118 (step 127). At the same time, the number of photographing operations is indicated on the display unit 222 (step 128). On the other hand, if the bar code of the original document 4 has not been correctly read (step 126), the reject solenoid 114 is energized to shift the guide plate 113 whereby the original document 4 is guided to the reject tray 116 (step 130, 131). After a predetermined time, the reject solenoid 114 is deactivated (step 132) to return the guide plate 113 to the original position. Then the steps 123 to 132 are repeated until the original documents 4 on the feed tray 110 are exhausted (step 137).

For photographing the rejected original documents 4, the mode selector switch 120 is not turned on (step 123), and the index data of the original document are read with the bar code reader 6 (step 124). At the same time the display mode of the display unit is switched to the display of the bar code number (step 124) thereby allowing confirmation of the input data. Then said original document, of which index data have been entered, is fed again (step 135). In this case the bar code scanner 112 does not effect the reading operation, so that the original document 4 is photographed without being rejected, and the display unit is again switched to the display of the number of photographing operations (steps 127, 128, 136, 129, 137). In this manner all the original documents 4 can be photographed (step 138).

In case of effecting the photographing operation only, without the indexing, the operator turns on the power supply (step 121), then resets the display mode to the display of the number of photographing operations (step 122), and turns on the mode selector switch 121 (step 123). In response the alarm lamp 121 is turned on (step 133), and the sheet feeding is conducted (step 135). Thus the original document 4 is photographed without the reading of the bar code (step 127). At the same time the display unit 222 indicates the number of photographed original documents (steps 128, 129). In this manner the photographing operation can be completed (steps 137, 138). In this case the alarm lamp 121 is turned on when the mode selector switch is turned on, in order to prevent a mistake that original documents with bar codes are photographed in this state without the reading of the index data, without being noticed by the operator.

Figure 24:
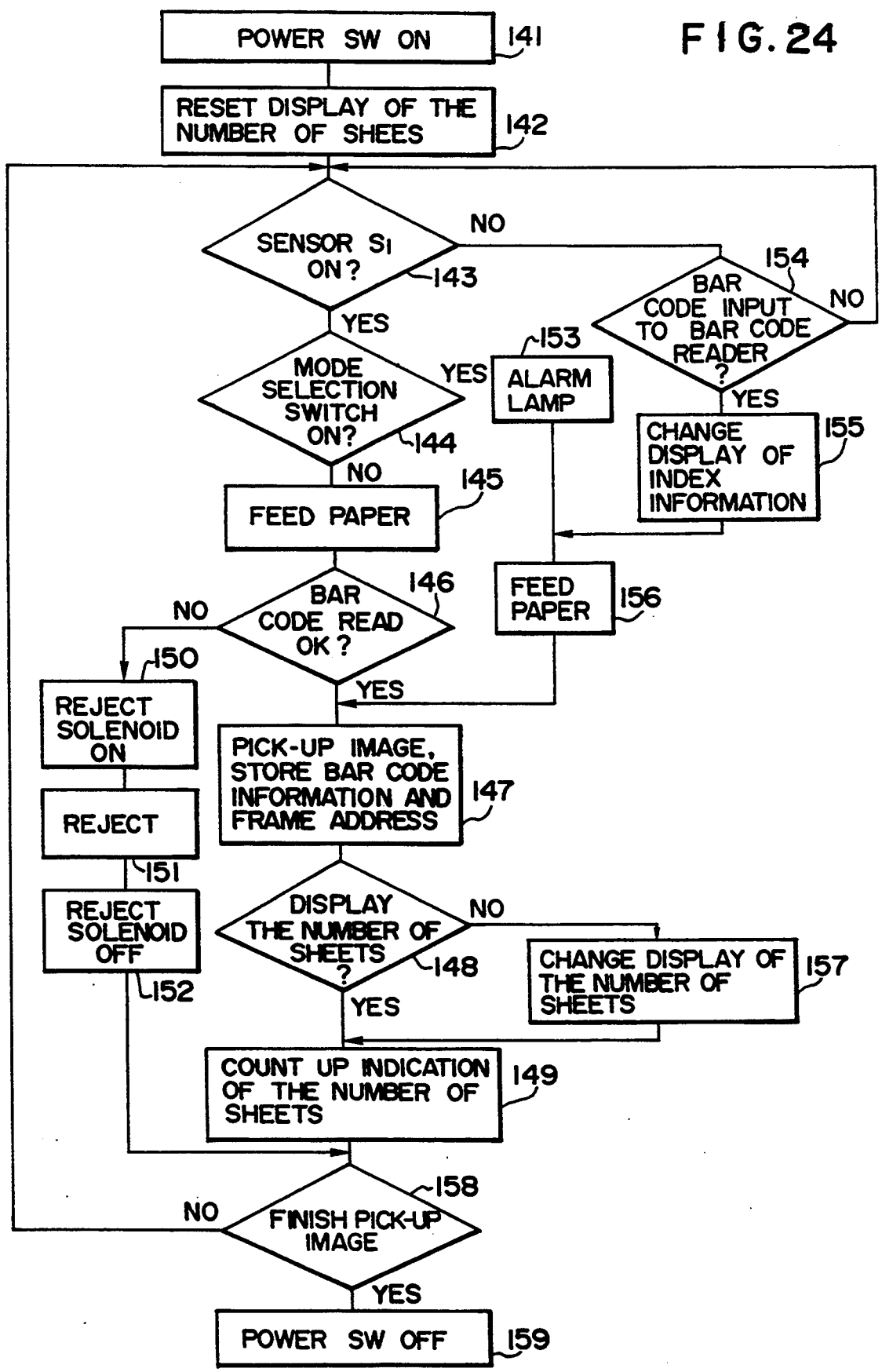
FIG. 24 is a flow chart showing the control sequence of photographing operation etc. in another embodiment of the present invention.

FIG. 24 is a flow chart showing the function of another embodiment of the present invention, utilizing the apparatus shown in FIG. 21 and involving additional functions. In this embodiment the sensor S1 for detecting the sensor in the feed tray 110 functions also as a mode preferential switch, whereby the alarm lamp 121 is turned on when the sensor S1 detects the original document. When the original document 4 is present in the feed tray 110, the first mode for automatically reading the bar code of the original document with the bar code scanner 112 and photographing the image is selected in preference to the second mode for reading the bar code of the original document with the bar code reader 6 and photographing the image. At the photographing, the power switch is turned on (step 141), and the display unit 222 is reset to a mode of displaying the number of photographing operations (step 142). Then, if the original document 4 is present in the feed tray 110, the sensor S1 is activated (step 143) to preferentially select the first mode, whereby, as in the preceding embodiment, the bar code is read with the bar code scanner 112 and the image is photographed (steps 144–152). In this state the reading of the bar code with the bar code reader 6 and the key input are not accepted. Then, when the original documents in the feed tray 110 are exhausted, the sensor S1 is deactivated (step 143) to enable the bar code reading and the photographing in the second mode. Thus, as in the preceding embodiment, the rejected original documents are subjected to the bar code reading with the bar code reader 6 and the photographing operation (steps 154, 155, 156, 147, 148, 157, 147, 158). In this manner the photographing operation for all the original documents is completed (step 159).

On the other hand, in case of photographing without indexing, after the sensor S1 is activated (step 143), the photographing switch 120 is turned on (step 144), and the original feeding and the photographing are conducted as in the preceding embodiment (steps 153, 156, 147, 148, 149, 158). The photographing operation is completed in this manner (step 159).

In the present embodiment, since the first mode is selected in preference to the second mode, the manipulation of the bar code reader 6 during the bar code reading and the image photographing in the first mode does not cause any erroneous operation.

The foregoing embodiments have been explained with an apparatus employing a bar code reader, a bar code scanner and a microfilm camera, but the present invention is not limited to such embodiments. For example the bar code reader may be replaced by a key input unit or a hand-held scanner utilizing a CCD.

In the foregoing embodiment, the use of the bar code reader as input means eliminates erroneous input caused for example by errors in key manipulation, in comparison with the case of using a key input unit, thereby enabling exact and rapid reading and input of the code data.

In addition the preferential selection of the first mode prevents the erroneous operation even if the input unit is manipulated during the bar code reading and image photographing in the first mode.

Also the use of a display unit, capable of indicating the number of recorded images at the photographing of the original image and indicating the index data at the index data reading with the input means, ensures more accurate data reading and image photographing operations.

Figure 25:
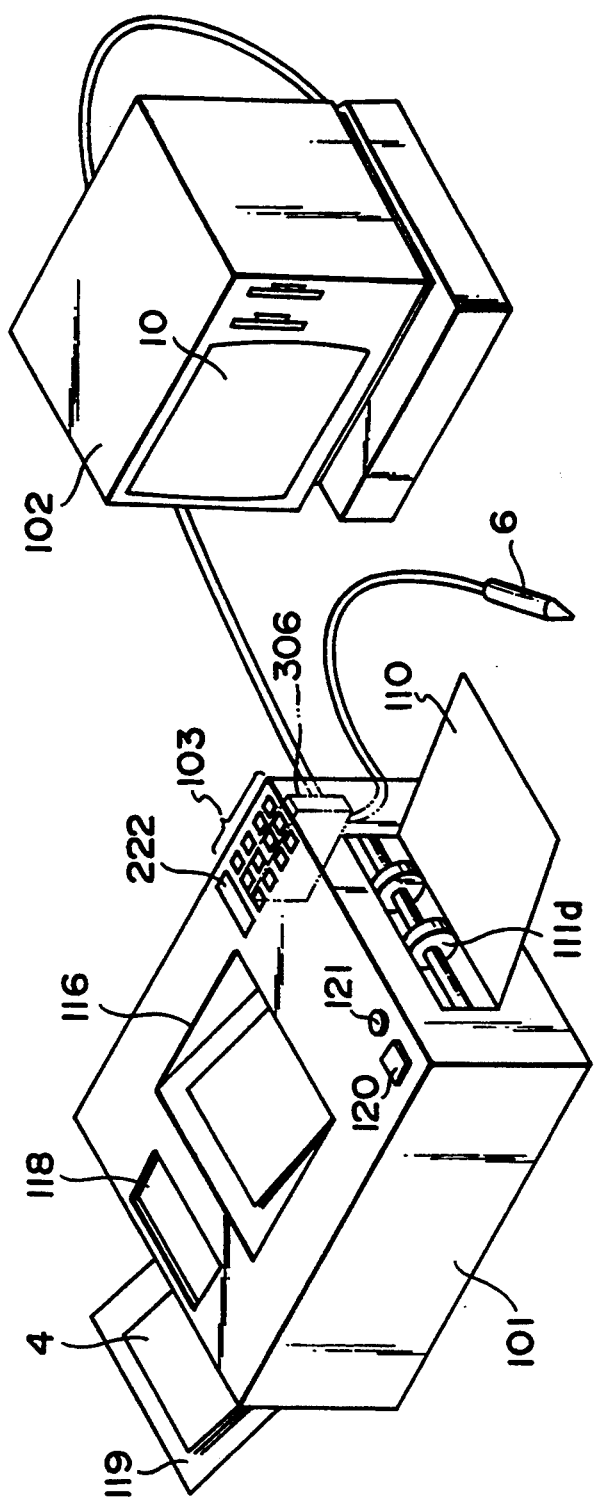
FIG. 25 is an external perspective view of an image recording apparatus constituting a seventh embodiment of the present invention.
Figure 26:
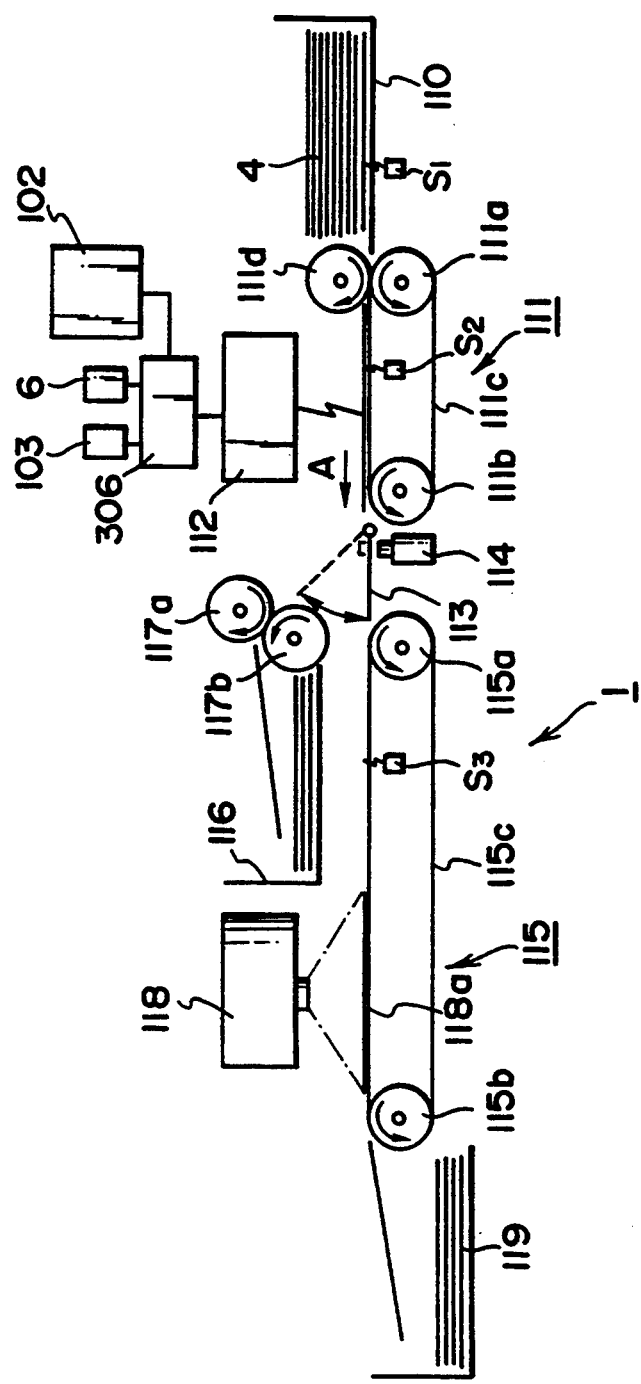
FIG. 26 is a longitudinal cross-sectional view of said embodiment.

FIGS. 25 and 26 show an image recording apparatus constituting a seventh embodiment of the present invention, wherein the bar code reader 6 is connected to the photographing unit 101, and the key input unit 103 is provided in said photographing unit 101.

The bar code scanner 112 is used as reading means for entering the index data by automatically reading the bar code attached to the original document 4 during the transportation thereof, while the bar code reader 6 constitutes first input means for entering the index data by manual reading of the bar code, and the key input unit 103 constitutes second input means for manual entry of the index data. The index data entered by said reading means and input means are supplied to a control circuit 306 provided in the photographing unit 1, and are then supplied to the control unit 102 and stored therein.

Figure 27:
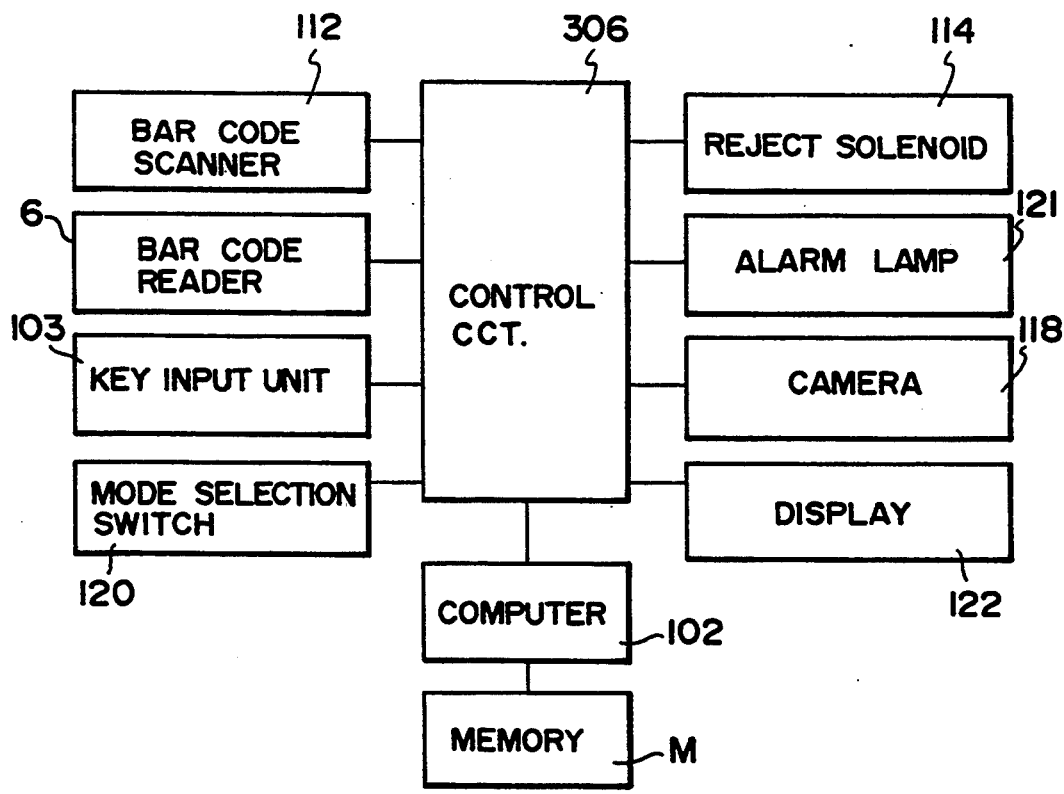
FIG. 27 is a block diagram showing a main control system of said embodiment.

FIG. 27 shows the control system of the present embodiment. The bar code scanner 112, key input unit 103, reject solenoid 114, camera 118, mode selector switch 120, alarm lamp 121 and display unit 222 are connected to the control circuit 306, and the bar code reader 6 is also connected thereto. Said control circuit 306 is connected to the control unit 102 consisting of a computer, and the index data are once entered into the control circuit 306 and then transferred to the control unit 102.

Figure 28B:
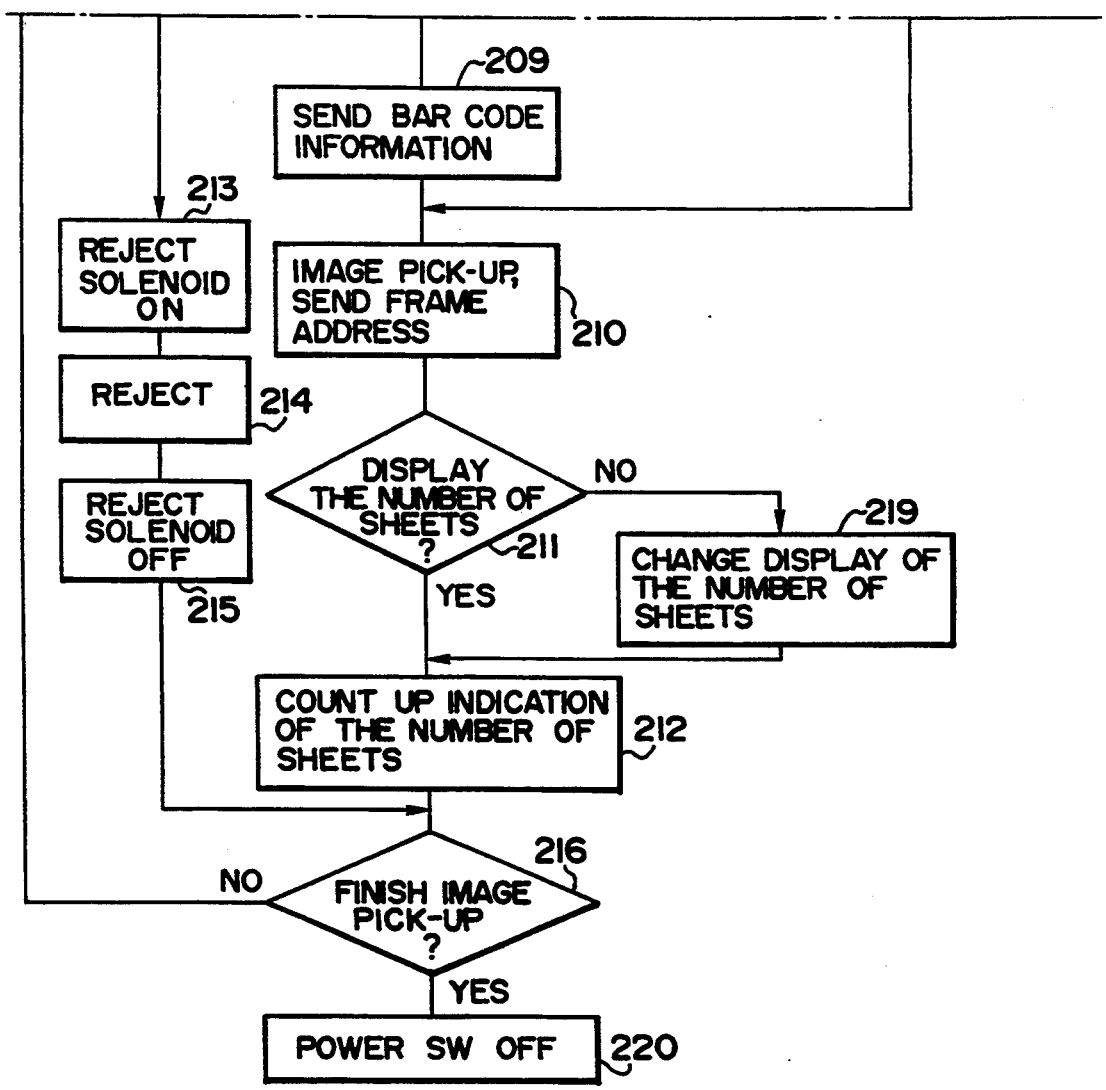

Now reference is made to FIG. 28A and 28B for explaining the function of the present embodiment.

In case of photographing original documents with bar codes, the operator at first turns on the power switch (step 201), then resets the display unit to a mode of displaying the number of photographed images (step 202), and effects the feeding of the original document without turning on the switch 120 and without the input by the bar code reader 6 or the key input unit 103 (steps 203–206). In response, the original document, subjected to the bar code reading with the bar code scanner 112, is transported in a direction shown in FIG. 26 by means of the transport means 111, guide plate 113 and transport means 115. Then the sensor S3 is activated upon detecting the original document 4 on the belt 115c, whereupon the index data are transferred from the control circuit 206 to the control unit 106 (steps 207–209). Thereafter the original document is photographed on the microfilm with the camera 118 (step 210), and the number of photographing operations is simultaneously indicated on the display unit 222 (step 212). On the other hand, when the bar code of the original document is not properly read (step 207), the reject solenoid 114 is energized to shift the guide plate 113, whereby the original document is guided to the reject tray 116 (steps 213, 214). Thereafter the reject solenoid 114 is deactivated (step 215) to return the guide plate 113 to the original position. The steps 201–215 are repeated until the original documents on the feed tray 110 are exhausted (step 216).

In case of photographing the rejected original documents, the switch 120 is not turned on (step 203), and the index data of each original document are entered into the control circuit 306 by means of the bar code reader 6 or the key input unit 103 (steps 204, 205). At the same time the display unit 222 is shifted to a mode of displaying the index data (step 217), thereby allowing to confirm the entered data. Then the original document, of which index data have been entered is fed again (step 218). In this case, since the bar code scanner 112 does not execute the reading operation, the original document is sent onto the belt 115c without rejection. Then the sensor S3 is activated upon detecting said original document, whereby the index data are transferred from the control circuit 306 to the control unit 102 (steps 208, 209). The index data entered into the control circuit 206 are sent to the control unit 102 through a line same as that used for the transfer of the index data entered by the key input unit 103, and a same timing as the sensor S3 is activated, regardless whether the first-mentioned index data are entered by the bar code reader 6 or the key input unit 103. Also the reading and input of the bar code data can be made through the bar code reader 6 or the key input unit 103, depending on the state of the original document.

The original document on which index data have been entered is transported to the photographing position 118a on the belt 115c for effecting the photographing operation, and, at the same time, the display unit 222 is simultaneously shifted to a mode of indicating the number of photographing operations (steps 210, 211, 219, 212, 216). In this manner the photographing operation is completed for all the original documents (step 220).

In case of effecting the photographing operation only, without indexing, the operator turns on the power supply (step 201), then resets the display to a mode of indicating the number of photographing operations (step 202), and turns on the switch 120 (step 203). In response the alarm lamp 121 is turned on (step 221), and the original feeding is conducted (step 222), whereupon the original is photographed without the reading of the bar code (step 210). At the same time the display unit 222 indicates the number of photographing operations (steps 211, 212). The photographing operation can be completed in this manner (step 216, 220).

In the present embodiment, even when the bar code data cannot be exactly read with the bar code scanner 112 constituting the reading means, the bar code data can be still entered either from the bar code reader 6 serving as the first input means or the key input unit 103 serving as the second input means, according to the smear or lack of the original document, so that the code data can be securely entered for all the original documents.

Also the transfer of the code data to the control unit 102 is always conducted through a same line and at a same timing. It is therefore possible to shorten the execution time and to improve the efficiency of processing of the index data.

Figure 29B:
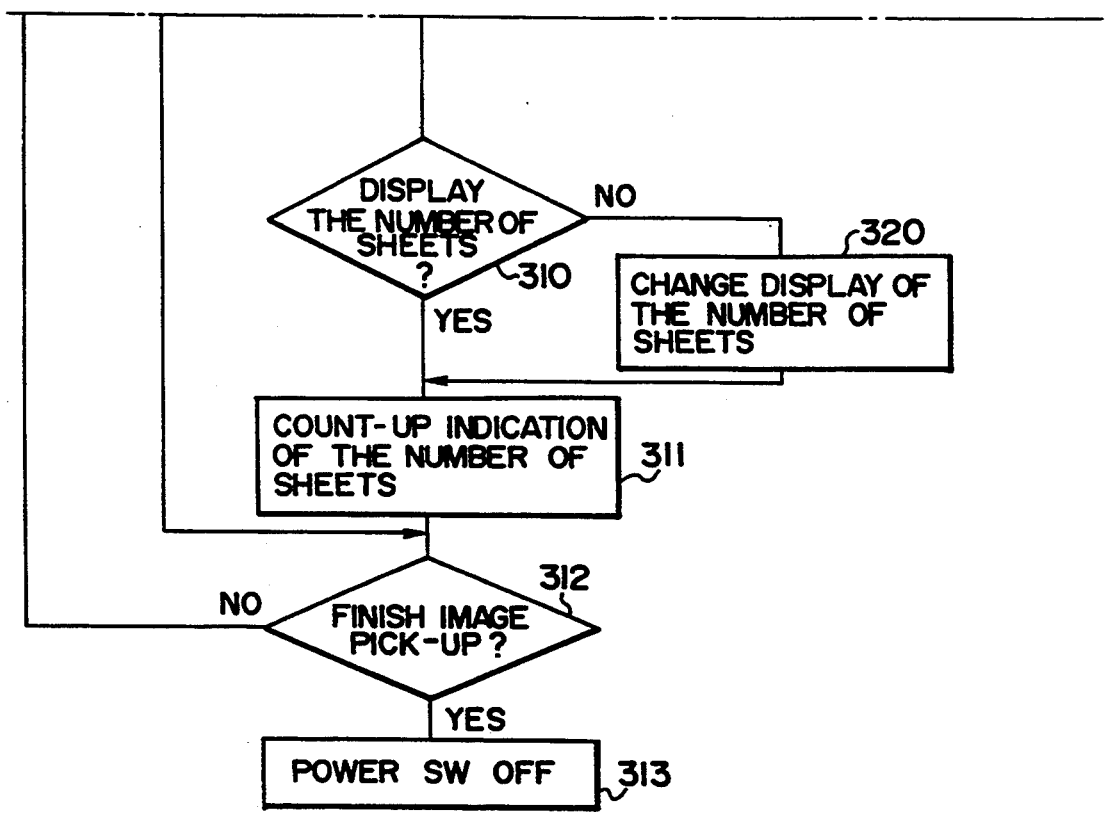

FIG. 29A and 29B is a flow chart showing the function of another embodiment of the present invention, employing the apparatus shown in FIGS. 25 and 26 and involving additional functions. In the present embodiment, the sensor S1 for detecting the original document in the feed tray 110 functions also as a preferential mode switch, and, when an original document is present in the feed tray 110, there is selected the first mode for automatically reading the bar code of the original document with the bar code scanner 112 and photographing said original document, in preference to the second mode for entering the index data of the original document with the bar code reader 6 or the key input unit 103 and photographing said original document. At first the operator turns on the power switch (step 301) and resets the display to a mode of indicating the number of photographing operations (step 302). Then, if an original document is present in the feed tray 110, the sensor S1 is activated (step 303), whereby the first mode is preferentially selected to effect the bar code reading with the bar code scanner 112 and the photographing operation (steps 304–315). In this state the reading and input of the bar code with the bar code reader 6 or the key input unit 103 are not accepted. When the original documents in the feed tray 110 are exhausted, the sensor S1 is deactivated (step 303) to enable the bar code reading and the photographing in the second mode. Thus, as in the preceding embodiment, the rejected original documents are subjected to the bar code reading with the bar code reader 6 or the key input unit 103 and the photographing operation (steps 316, 317, 318, 319, 307, 308, 309, 310, 320, 311, 312). In this manner the photographing operation can be completed for all the original documents (step 321).

Also in case of effecting the photographing operation only without the indexing, the sensor S1 is activated (step 303), then the switch 120 is turned on (step 304), and the feeding and photographing of the original document are conducted in the same procedure as in the preceding embodiment (steps 322, 323, 309, 310, 311, 312). The photographing operation can be completed in this manner (step 321).

The present embodiment has same advantages as in the preceding embodiment. In addition, since the first mode is selected in preference to the second mode, no errors in operation are caused by the manipulation of the bar code reader 6 or the key input unit 103 during the bar code reading and photographing operations in the first mode.

Figure 30:
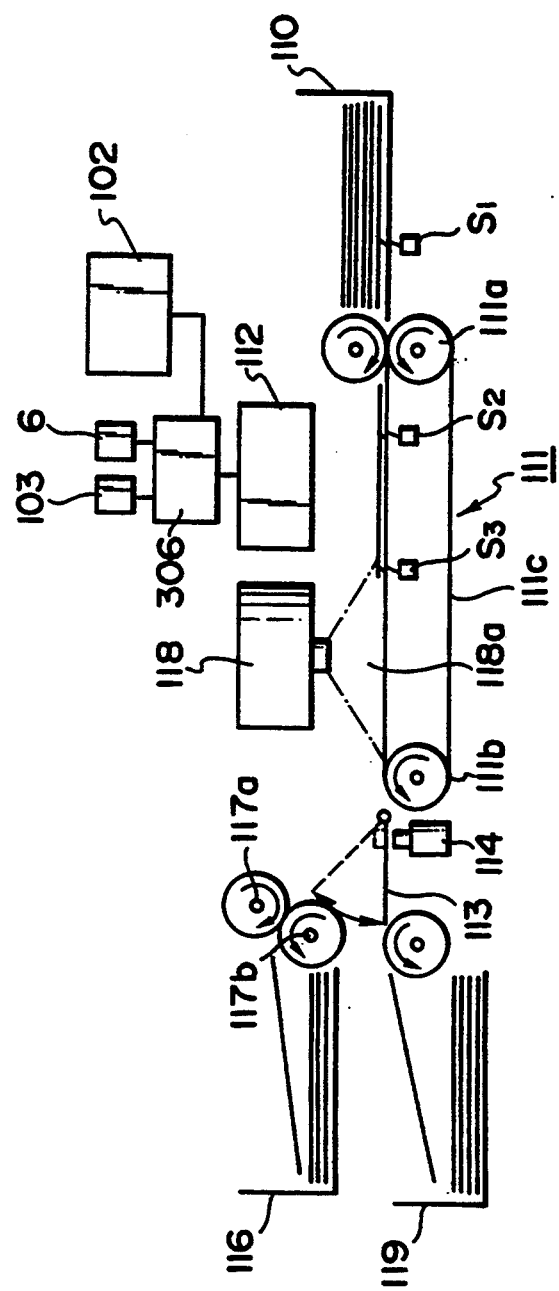
FIG. 30 is a longitudinal cross-sectional view showing still another embodiment of the image recording apparatus of the present invention.

FIG. 30 shows still another embodiment of the image recording apparatus of the present invention, wherein same components as those in FIG. 26 are represented by same symbols.

In this embodiment, a rejecting unit, consisting of the guide plate 113 and the reject solenoid 114, is positioned at the downstream side of the camera 118. The photographing operation is conducted as in the preceding embodiment according to the sequence shown in FIG. 28. Also in the present embodiment, the positional relationship between the camera 118 and the rejecting unit is not important, since the original documents are not photographed if the bar codes thereof are not read.

What is claimed is:

1. An image recording apparatus, comprising:
   first read means for reading identifying data on a document, said first read means being movable manually to read the identifying data at a desired position on the document;
   input means for inputting the identifying data, said input means inputting the identifying data by key operation;
   convey means for conveying the document along a predetermined path:
   second read means for reading the identifying data, said second read means being disposed along the predetermined path to read the identifying data on the document that is conveyed;
   capture means for capturing an image on the document;
   record means for recording the identifying data read by said first or second read means, or input by said input means, and an address of the image corresponding to the read or input identifying data.

2. An image recording apparatus according to claim 1, further comprising control means for controlling said capture means so that the image is captured when said first read means reads the identifying data correctly, but is not captured when said first read means does not read the identifying data correctly.

3. An image recording apparatus according to claim 2, further comprising control means for controlling said capture means so that the identifying data and address are captured when said first read means reads the identifying data correctly, but are not captured when said first read means does not read the identifying data correctly.

4. An image recording apparatus according to claim 1, further comprising switch means for switching between a first mode wherein the identifying data is read by said first read means or input by said input means, and a second mode wherein the identifying data is read by said second read means.

* * * * *

UNITED STATES PATENT AND TRADEMARK OFFICE
CERTIFICATE OF CORRECTION

PATENT NO. : 5,430,276
DATED : July 4, 1995
INVENTOR(S) : KAZUO OHTANI, ET AL.

It is certified that error appears in the above-identified patent and that said Letters Patent is hereby corrected as shown below:

COLUMN 3

Line 45, "FIG. 28A" should read --FIGS. 28A-- and "is" should be deleted.
Line 48, "FIG. 29A" should read --FIGS. 29A-- and "is" should be deleted.

COLUMN 4

Line 14, "8" (first occurrence) should read --7--.
Line 47, "complied" should read --compiled--.

COLUMN 5

Line 21, "code 2a" should read --code a2--.
Line 59, "ceeds" should read --ceed--.
Line 61, "represent" should read --represented--.

COLUMN 6

Line 51, "document" should read --documents--.

COLUMN 8

Line 3, "repeated" should read --repeating--.

COLUMN 9

Line 35, "(steps 115)." should read --(step 115).--.
Line 42, "placed" should read --placed with--.

UNITED STATES PATENT AND TRADEMARK OFFICE
CERTIFICATE OF CORRECTION

PATENT NO. : 5,430,276
DATED : July 4, 1995
INVENTOR(S) : KAZUO OHTANI, ET AL.

It is certified that error appears in the above-identified patent and that said Letters Patent is hereby corrected as shown below:

COLUMN 10

Line 26, "(step 130," should read --(steps 130,--.

COLUMN 12

Line 24, "FIG. 28A" should read --FIGS. 28A--.

COLUMN 13

Line 31, "(step 216," should read --(steps 216,--.
Line 46, "FIG. 29A" should read --FIGS. 29A--.

COLUMN 14

Line 56, "ment;" should read --ment; and--.

Signed and Sealed this

Twenty-first Day of November, 1995

Attest:

BRUCE LEHMAN

Attesting Officer    Commissioner of Patents and Trademarks